United States Patent [19]
Griffith et al.

[11] Patent Number: 5,887,176
[45] Date of Patent: Mar. 23, 1999

[54] METHOD AND SYSTEM FOR REMOTE MONITORING AND TRACKING OF INVENTORY

[75] Inventors: David W. Griffith, Vienna; Alan C. Hurkamp, Alexandria; Donald K. Salmon, Reston, all of Va.

[73] Assignee: Randtec, Inc., Fairfax, Va.

[21] Appl. No.: 671,616

[22] Filed: Jun. 28, 1996

[51] Int. Cl.$^6$ ................................................. G08B 5/22
[52] U.S. Cl. .................. 395/750; 395/200.5; 395/222; 340/825.54
[58] Field of Search .............. 340/825.54, 575, 340/505; 342/44; 395/200.5, 750, 222

[56] References Cited

U.S. PATENT DOCUMENTS

| | | | |
|---|---|---|---|
| 4,691,202 | 9/1987 | Denne et al. | 340/825.54 |
| 5,028,918 | 7/1991 | Giles et al. | 340/825.54 |
| 5,099,226 | 3/1992 | Andrews | 340/572 |
| 5,406,297 | 4/1995 | Caswell et al. | 343/741 |
| 5,606,313 | 2/1997 | Allen et al. | 340/825.54 |

*Primary Examiner*—Meng-Ai T. An
*Assistant Examiner*—Jigar Pancholi
*Attorney, Agent, or Firm*—Hazel & Thomas, P.C.

[57] ABSTRACT

The invention encompasses a system that utilizes radio frequency circuitry in combination with microprocessor devices and specially designed software to provide an improved structure and operation for the monitoring, protection and control of inventory assets. Generally, the system is embodied in a system controller unit, one or more interrogator devices and multiple transponder units. The system controller unit may be a personal computer (PC) based device for effecting the control and monitoring of the system's operation. In addition, the system controller unit serves as a data collection device and as an alarm device. The interrogator device(s) incorporate a transceiver controlled by microprocessor circuitry within the interrogator devices. The transponder units also include a radio transceiver and microprocessor circuitry. The transponder units are attached to a container or item to be monitored and protected. The microprocessor circuit and the memory therein store the transponder identification code and can also contain data on the contents or nature of the container/item to which it is attached. When a transponder receives a RF signal from an interrogator device containing a correct transponder identification code, the transponder unit is enabled for receiving and processing messages. The transponder unit may also respond by sending out its own RF signal which contains an acknowledgment and all available data as requested by the interrogator device.

49 Claims, 13 Drawing Sheets

METHOD AND SYSTEM FOR REMOTE MONITORING AND TRACKING OF INVENTORY

BACKGROUND OF THE INVENTION

1. Field of the Invention

The present invention relates to a method and system for the monitoring, tracking and inventory management of various assets and materials. In particular, the invention relates to inventory control by the monitoring of the status of the inventory using an automated process of interrogation and reply. In addition, the invention relates to controlling the distribution and shipment of material through the ability to remotely store and read manifest data to and from a plurality of transponders attached to the materials being shipped. Further, the invention involves a system for protecting stored assets and material through the use of the above-noted transponders as tamper-detecting devices and through the interfacing with those devices by interrogation to insure that the transponders and thereby, the material are still present. All in all, the invention provides a user with the ability to reduce the cost of inventory management and to enhance the security of valuable assets.

2. Prior Art

At the present time, most "automated" inventory management systems are based upon the use of a system of coded pattern of vertical bars called "bar codes." The bar codes are placed somewhere on the items or containers to be stored/inventoried to identify that item/container with a unique number. Even when using the most modern bar code readers that may be remotely linked to a computer database, the process of inventorying and identifying contents by container identification number is labor-intensive. If the process required the manual entry of database information on the inventoried contents, the process would, in addition, be open to unpredictable input errors. Consequently, a system based on using bar codes does not offer a reliable means for protecting and securing materials that require monitoring.

Some inventory management systems have begun to use radio frequency (RF) devices called tags that are attached to containers to permit remote container identification through a RF communication link. The use of both passive (i.e., no battery or external power source required) and active (i.e., powered) tags has been attempted. Passive tags offer the advantage of eliminating the need for a power source such as batteries, but suffer from a lack of an effective communications range. In such passive systems, the device on the container is programmed with a unique identification number that is transmitted back to an interrogator when it is activated by the signal from the interrogator. While this provides identification of the container, it does not account directly for the contents of the container. A separate database is required that relates the information concerning the contents of the container to its identification number. That database typically relies on manual entry for any content data, and for being updated with any changes in the contents of the container.

Active RF tags incorporate self-contained power sources, such as batteries, that provide the power necessary to operate higher powered transmitters. This increased transmitter power provides for increased communications range. In addition, the self-contained power source permits the additional circuitry necessary to store data and to transfer data to and from memory in the tags. RF tag-based systems offer a reduction in the cost of inventory and data entry by permitting the automated reading of the RF tags on the containers. However, currently available systems suffer from very short battery lifespans and very slow data transfer rates.

All current inventory control systems involve some means of counting items and some means of assessing loss. Generally, the data is processed or stored in a computer database system. The data may be entered by hand or, in the case of a system using bar codes, bar code scanners may be used to directly load the results of an inventory into the computer. In either case, some degree of manual inventory and/or data entry is required, thereby resulting in very costly processes.

SUMMARY OF THE INVENTION

To overcome the problems and shortcomings in the prior art as illustrated above, a main object of the present invention is to provide a process and system for periodically interrogating and verifying the presence and condition of transponder units attached to the containers or items being monitored. In addition, the present invention is directed to providing a process and structure for monitoring sensors and/or tamper-detecting devices, wherein an alarm can be transmitted to a monitoring station when certain conditions are detected by those sensors or devices.

A more specific object of the present invention is to allow long range communications between the various elements of the system with rapid data transfer rates in their communication. In particular, this object of the present invention is directed to allowing ranges in excess of over 200 feet and data transfer rates of 19,200 bits per second.

Another more specific object of the present invention is to provide a system that incorporates elements having long operational and service lives. In particular, this object of the present invention is directed to allowing battery service lives of three years or more.

A further specific object of the present invention is to provide a system that allows the use of a variety of remote sensors to monitor, among other conditions, weight, temperature and humidity, whereby data on such conditions can be transmitted to a monitoring and data logging station.

In a broad aspect, the invention encompasses a system that utilizes radio frequency circuitry in combination with microprocessor devices and specially designed software to provide an improved structure and operation for the monitoring, protection and control of inventory assets to a degree not heretofore available. Generally, the system is embodied in a system controller unit, one or more interrogator devices and multiple transponder units.

The system controller unit may be a personal computer (PC) based device that contains the unique software for effecting the control and monitoring of the system's operation. In addition, the system controller unit may serve as a data collection device and as an alarm device.

The interrogator device(s) incorporate a radio transmitter and receiver (transceiver) controlled by microprocessor circuitry within the interrogator devices. Each interrogator device contains multiple microprocessors including solid state read/write memory. The microprocessors contain the unique software/firmware which effects the control of the interrogation process.

The transponder units also include a radio transceiver and microprocessor circuitry. The transponder units are attached to a container or item to be monitored and protected. Each transponder contains a microprocessor circuit that also includes solid state read/write memory. The microprocessor circuit and the memory therein store the transponder identification code and can also contain data on the contents or nature of the container/item to which it is attached.

In the general operation of the present invention, when a transponder receives an RF signal from an interrogator device containing a correct transponder identification code, the transponder unit is enabled for receiving and processing messages. The transponder unit may also respond by sending out its own RF signal which contains an acknowledgment and all available data as requested by the interrogator device.

Among the main features of the invention, a power saving technique is implemented in the transponder unit to ensure a very long usable battery life. This power saving technique is embodied in the use of very low power circuitry with a carefully timed power control sequence that supplies power to the transponder unit's circuitry only when necessary for operation.

The main features of the present invention include at least two distinct modes of operation for the system of the present invention. The first mode of operation is a set periodic interrogation or polling method, while the second mode is a random or aperiodic interrogation method. In the periodic mode of operation, the interrogation of the transponders occurs at regular preset intervals. Each transponder is interrogated at preset intervals to determine if the transponder is still present and active, and to receive any sensor data from the transponder. This periodic method of interrogation affirms the presence and condition of the container to which the transponder is attached, thereby providing a high degree of physical security. This method is best suited to applications wherein materials or items are stored and not moved often.

In the second mode of operation, an interrogation of one or more transponders may be initiated at any time. In this method, the transponder devices are programmed to fully activate or "awaken" at preset intervals and to listen for a request signal from the interrogator. If the request signal is received, the transponders will remain awake long enough to determine if the signal contains its identification (ID) number. If the interrogator's request signal does not contain the appropriate ID number, the transponder will go back to being minimally active or "asleep." If the request signal does contain the appropriate ID number, the transponder will respond to the interrogator and will then receive instructions from the interrogator to either report data or to receive data.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENTS

Figure 1:
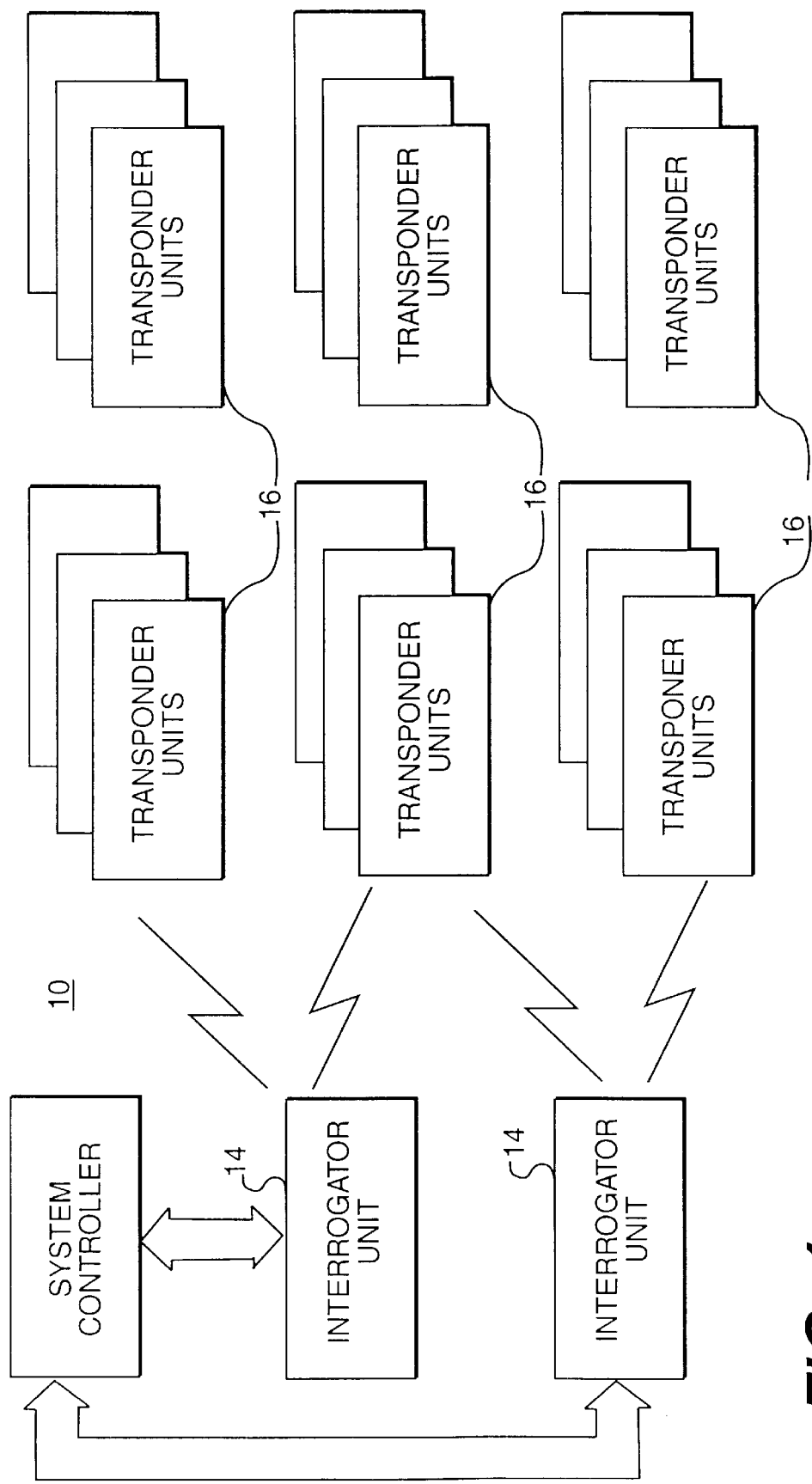
FIG. 1 shows a general block diagram of the overall system of the present invention.

With reference to the figures, like reference characters will be used to indicate like elements throughout the several views. As shown in FIG. 1, the system 10 of the present invention generally incorporates a system controller 12, one or more interrogators 14 and a plurality of transponders 16. The system controller 12 may consist of a personal computer (PC) that has specifically designed system software installed. As will be discussed further below, the interrogators 14 each include a micro-controller unit and a transceiver having a transmitter and a receiver. The transponders 16 may number anywhere between one and several thousand depending on the particular application. Each transponder also includes a controller circuit and a transceiver having a transmitter and a receiver as will be discussed further hereinbelow.

Figure 2:
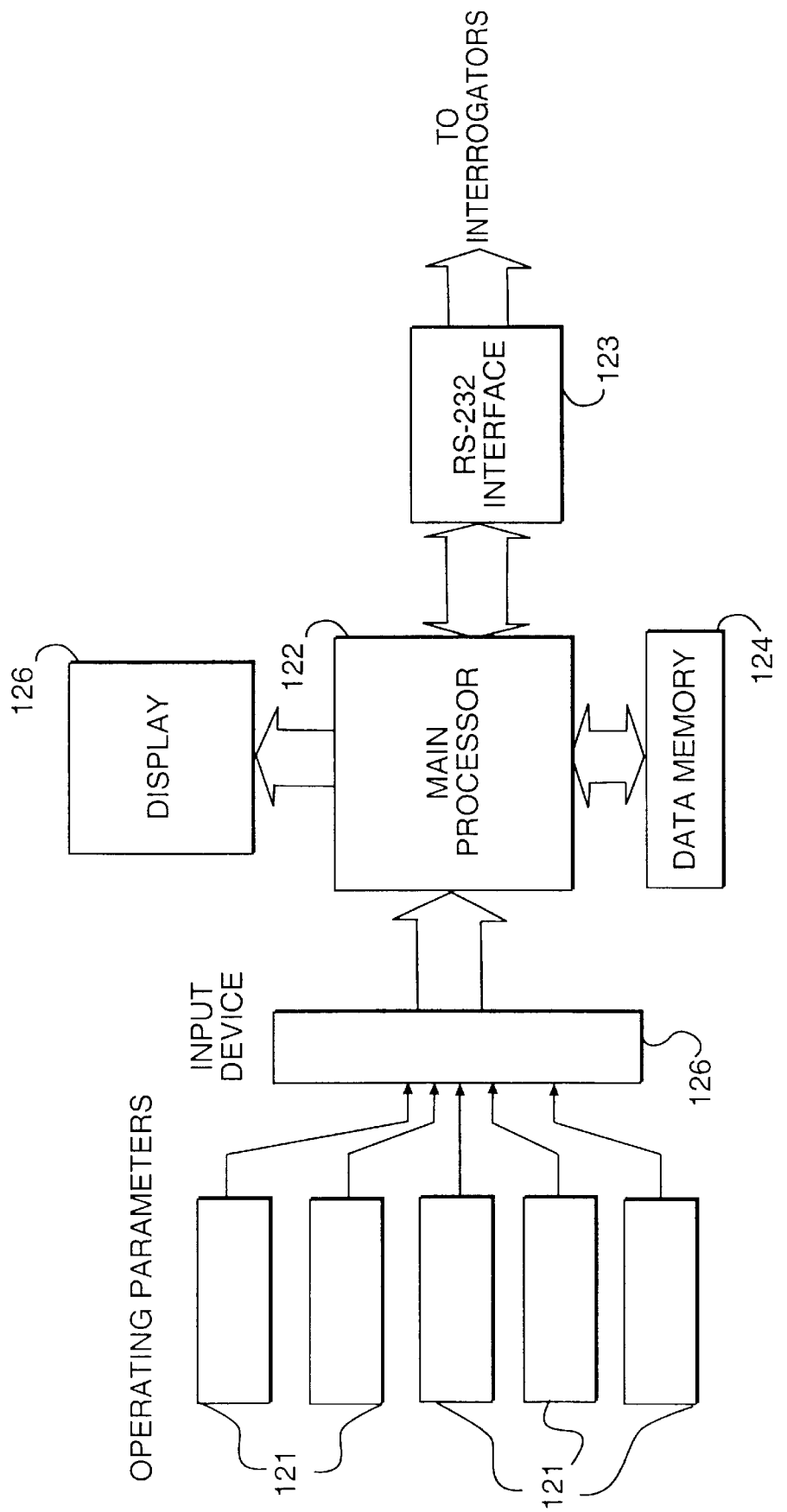
FIG. 2 shows a general system block diagram of the system controller according to the present invention.

The system controller 12 implemented as a PC (as known in the art) provides the human operator interface to the system. As illustrated in FIG. 2, the system controller 12 incorporates a series of operating parameters 121 stored in memory and selected by an operator according to the particular application in which the system is used. The operating parameters 121 are accessed by the main processor 122 in order to conduct and implement the desired monitoring and interrogation processes. An RS-232 input/output interface 123 (i.e., an RS-232 communications bus) to the interrogator(s) 14 is connected to the system controller 12 and to the main processor 121 whereby command and data signals can be communicated between the system controller 12 and the interrogator(s) 14. A data memory 124 is used to store data received from the interrogator(s) 14 and collected by the interrogator(s) 14 from the transponders 16.

A display 125 is also connected to the system controller 12 and to the main processor 121 whereby the main processor 121 may output display data to a user. Such display data would include graphical displays of the raw data from the transponders 16, processed data derived from the raw data, warnings or alarm messages, and prompts or input requests to the user for additional data.

An input device 126 (e.g., a keyboard) connected to the main processor 122 would be used for receiving such additional data from the user. The input device 126 would also be used to input the operating parameters 121 into the memory of the system controller 12, as well as any initial and/or setup programming. Each of the elements and functions described above are implemented in the system controller 12 as software, hardware or a combination of both based on the particular application in a manner as would be known to one of skill in the art.

The operating parameters used by and inputted into the memory of the system controller 12 include:

(1) interrogation period data for periodic/polling type interrogation;

(2) interrogation commands for aperiodic interrogation;

(3) transponder identification numbers;

(4) transponder sensor port identifications; and (5) the directory or memory locations for recording data.

Once the operating parameters are determined and inputted, the system controller 12 does not perform an active role in the communication process between the interrogator(s) 14 and the transponders 16. The system controller monitors the overall operation and receives data from the interrogator(s) 14.

In the general operation of the system as described above, first, an operator enters the operating parameters 121 and any other program instructions into the system controller 12 via the input device 126. In the system controller 12, the main processor 122 formats the operating parameters and instructions into the system command protocol required for transmission to the interrogator(s) 14. The system controller 12 then outputs system commands to the interrogator(s) 14 via the RS-232 interface 123. Data sent from the system controller 12 to the interrogator(s) 14 is acknowledged by the interrogator(s) and then stored in the memory of the individual interrogators. Data from the individual transponders 16 are received by the interrogator(s) 14 and then transmitted to the system controller 12 via the RS-232 interface 123.

In one implementation of the system, a specified number of transponders 16 may be located so as to communicate with a specifically placed interrogator 14. As such, each group of transponders 16 will communicate with the interrogator 14 assigned to it, and that interrogator 14 will then communicate with the system controller 12.

Alternatively, if the particular application of the system requires that the containers or items being monitored need to be moved around and not simply be stationary, interrogators 14 may instead be placed at fixed locations whereby any transponder(s) 16 within an interrogator's range would be interrogated or monitored by that interrogator 16 for as long as the transponder(s) 16 are within range or at a particular location.

In another implementation, if the location of the containers/items being monitored along with their interrogator 14 is too far a distance to effectively communicate directly with the system controller 12, a second interrogator 14' (see FIG. 1) may be used to relay data from the first interrogator 14 to the system controller 12. In this implementation, the first interrogator 14 would be interrogated in a manner similar to a transponder 16, as will be further explained below.

Figure 3A:
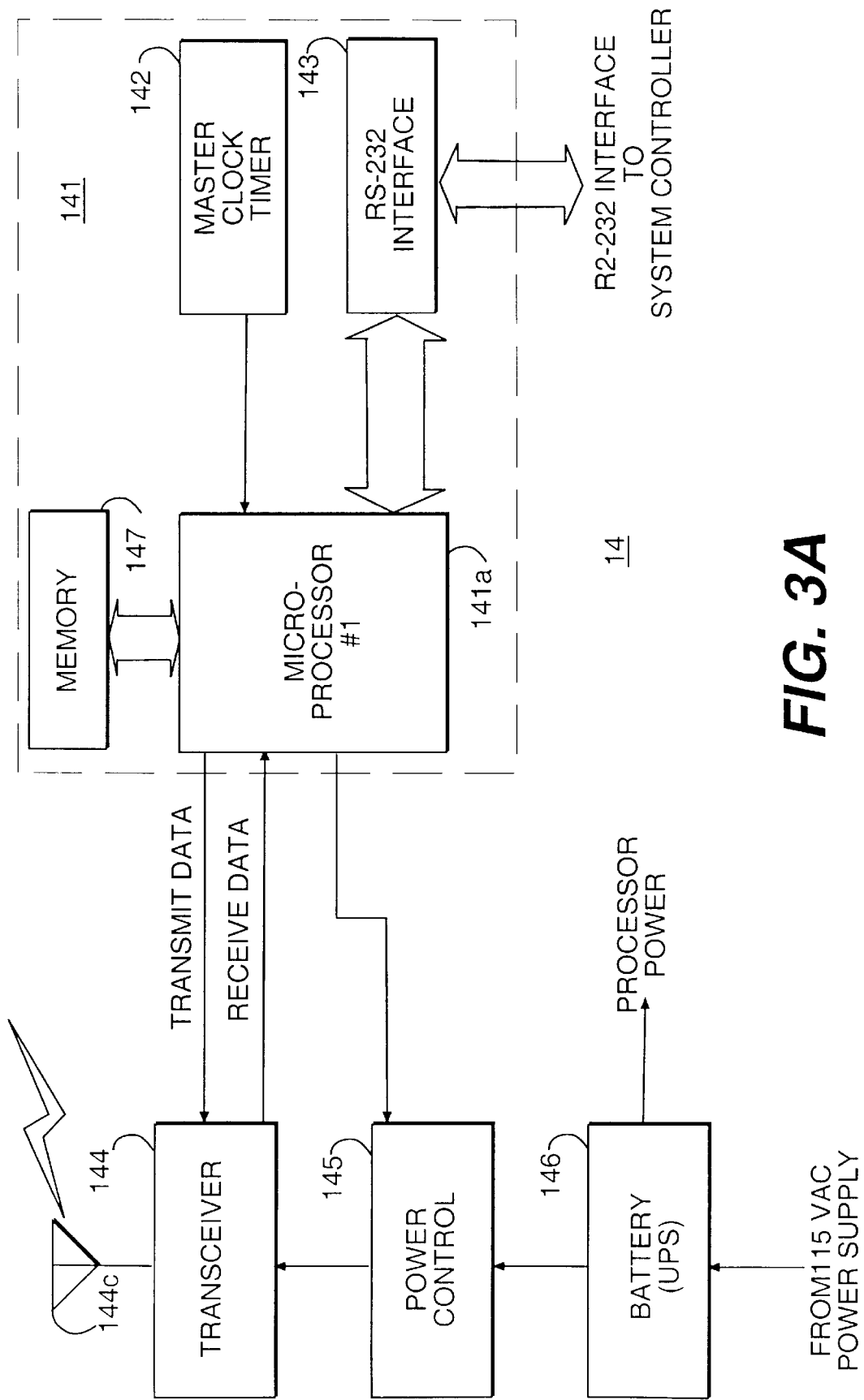
FIGS. 3A and 3B show a system block diagram of the components of an interrogator according to the present invention.

FIG. 3A illustrates a general block diagram of the components of the interrogator 14 according to a first embodiment for the interrogator. As shown, each interrogator 14 includes a digital controller circuit 141 containing a microprocessor 141*a,* a master clock timer circuit 142 and an RS-232 communication interface circuit 143. Each interrogator further includes a transceiver circuit 144 with an antenna 144*c,* a power control circuit 145 and a backup battery pack 146 that is constantly charged by an outside power supply (e.g., a 115 VAC power supply).

In this first embodiment, an 8051 derivative made by Intel is selected as the microprocessor 141*a*. The 8051 derivative internally has 6K of ROM and 128 bytes of RAM. The 128 bytes of RAM are used for storing system operational variables.

In addition to the memory internal to the microprocessor 141*a,* there is the first memory 147 operatively connected to the microprocessor 141*a* that embodies both program memory and operational memory. Fixed program functions are stored in the program memory of the first memory 147. In this first embodiment, the program memory comprises an 8 k EEPROM. The elements of the operational program of the interrogator 14 that are fixed are loaded onto the program memory, and the software control functions are executed from that program memory. The operational commands and command data set by the system controller 12, along with message data, are stored in the operational memory of the first memory 147 in the form of at least one 256K SRAM.

The master clock timer 142 is used to generate timing pulses for synchronizing the entire system. In this first embodiment, pulses every 500 msec are generated. The master clock timer 142 works in conjunction with the microprocessor 141*a,* and may be reset based upon data received from the system controller 12. The timing derived from the master clock timer 142 is also used to synchronize the process of transferring data to the remote transponders 16.

One function of the microprocessor 141*a* is to send and receive data from the transceiver 144, and to send and receive data from the system controller 12 via the RS-232 interface circuit 143. Data sent and received through the transceiver 144 are outputted/inputted via the antenna 144*a*. Basic setup information sent in the form of a data file from the system controller 12 is stored in the memory 147 of the microprocessor 141*a*. The setup information or file generally consists of (1) the number of transponders in the system; (2) the interrogation period when the polling mode of operation is used; (3) the transponder ID numbers; (4) transponder sensor assignments; and (5) an End-Of-Message command.

In addition, the microprocessor receives and decodes data from the remote transponders 16. The microprocessor 141*a* decodes signals from each transponder into an ID number first followed by sensor data, and then transmits the data through the RS-232 interface circuit 143 to the system controller 12.

Figure 3B:
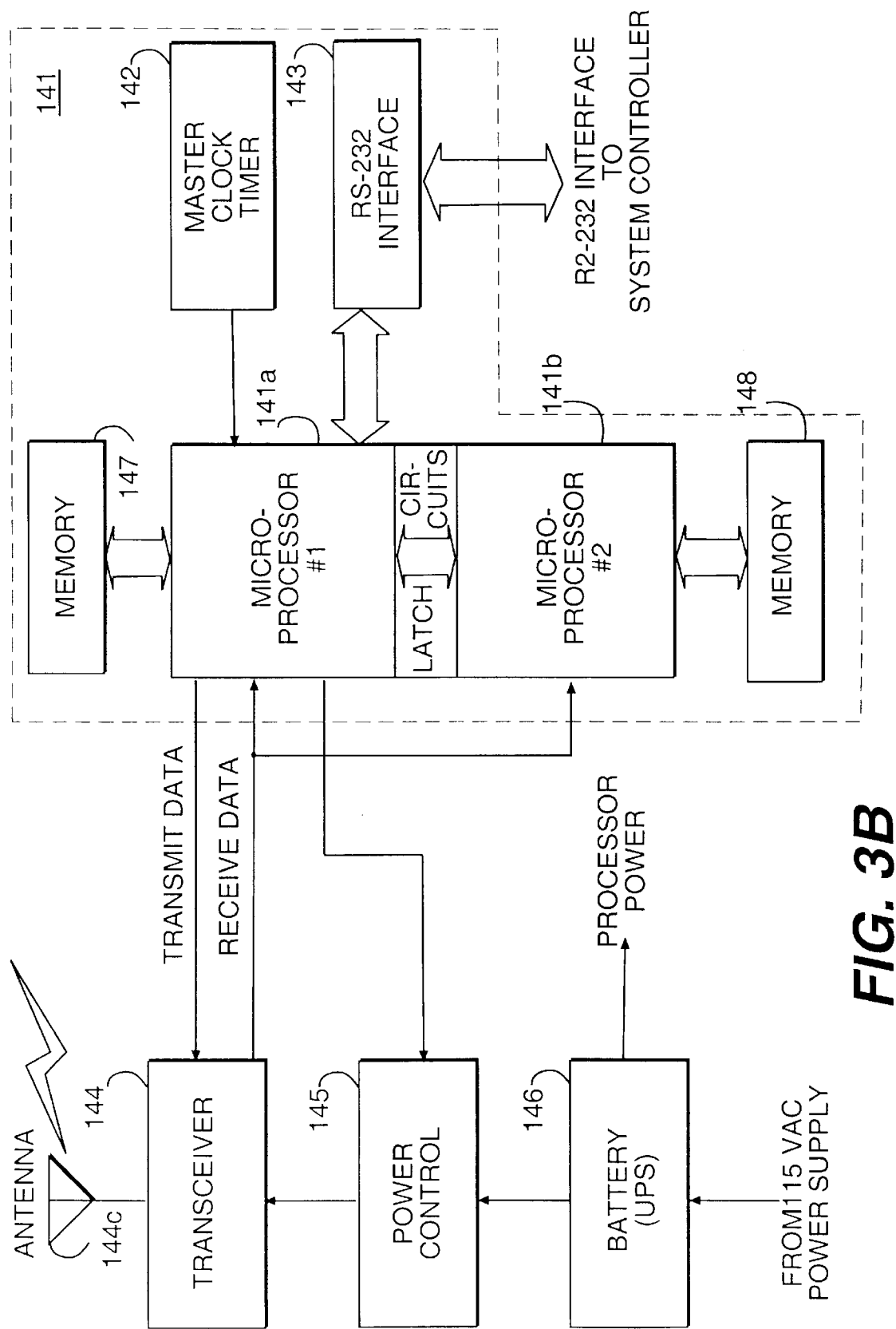

FIG. 3B illustrates a general block diagram of the components of the interrogator 14 according to a second embodiment for the interrogator. In this embodiment, each interrogator 14 includes a digital controller circuit 141 that contains two microprocessors 141*a,* 141*b,* in addition to the master clock timer circuit 142 and the RS-232 communication interface circuit 143. As in the first embodiment, each interrogator further includes a transceiver circuit 144 with an antenna 144*c,* a power control circuit 145, and a backup battery pack 146 that is constantly charged by an outside power supply (e.g., a 115 VAC power supply). However, latch circuits 150 are added to connect the first and second microprocessors 141*a,* 141*b* to each other.

As in the first embodiment, each microprocessor 141*a,* 141*b* of this second embodiment is implemented using 8051 derivative devices that internally have 6 k of ROM and 128 bytes of RAM. In this embodiment of the interrogator 14, the 6K of ROM in each microprocessor is not generally used. The 128 bytes of RAM in each device are used for storing system operational variables. In addition to the memory internal to the microprocessors 141a, 141b, there are the first memory 147 operatively connected to the first microprocessor 141a, and a second memory 148 operatively connected to second microprocessor 141b.

As in the first embodiment of the interrogator 14, the first and second memories embody both program memory and operational memory. Fixed program functions are stored in the program memory of each of the first and second memories 147, 148. In this embodiment also, the program memories are in the form of 8 k EEPROMs. The elements of the operational program of the interrogator 14 that are fixed are loaded onto the program memory, and the software control functions are executed from that program memory. The operational commands and command data set by the system controller 12, along with message data, are stored in the operational memory of each of the first and second memories 147, 148 in the form of 256K SRAMs.

As with the first embodiment, the master clock timer 142 is used to generate timing pulses for synchronizing the entire system (e.g., every 500 msec). The master clock timer 142 works in conjunction with the first microprocessor 141a, and may be reset based upon data received from the system controller 12. The timing derived from the master clock timer 142 is also used to synchronize the process of transferring data to the remote transponders 16.

The latch circuits 150 are connected between the first microprocessor 141a and the second microprocessor 141b so that data may be communicated between them.

The main function of the first microprocessor 141a is to send and receive data from the transceiver 144, and to send and receive data from the system controller 12 via the RS-232 interface circuit 143. Data sent and received through the transceiver 144 are outputted/inputted via the antenna 144a. Basic setup information sent in the form of a data file, as in the first embodiment, from the system controller 12 is stored in the first memory 147 of the first microprocessor 141a.

The main function of the second microprocessor 141b is to receive and decode data from the remote transponders 16. The second microprocessor 141b decodes signals from each transponder into an ID number first followed by sensor data. The second microprocessor then loads the data from the transponders 16 into the latch circuits 150. The first microprocessor 141a can then extract that data from the latch circuits 150, and transmit the data through the RS-232 interface circuit 143 to the system controller 12.

Figure 3C:
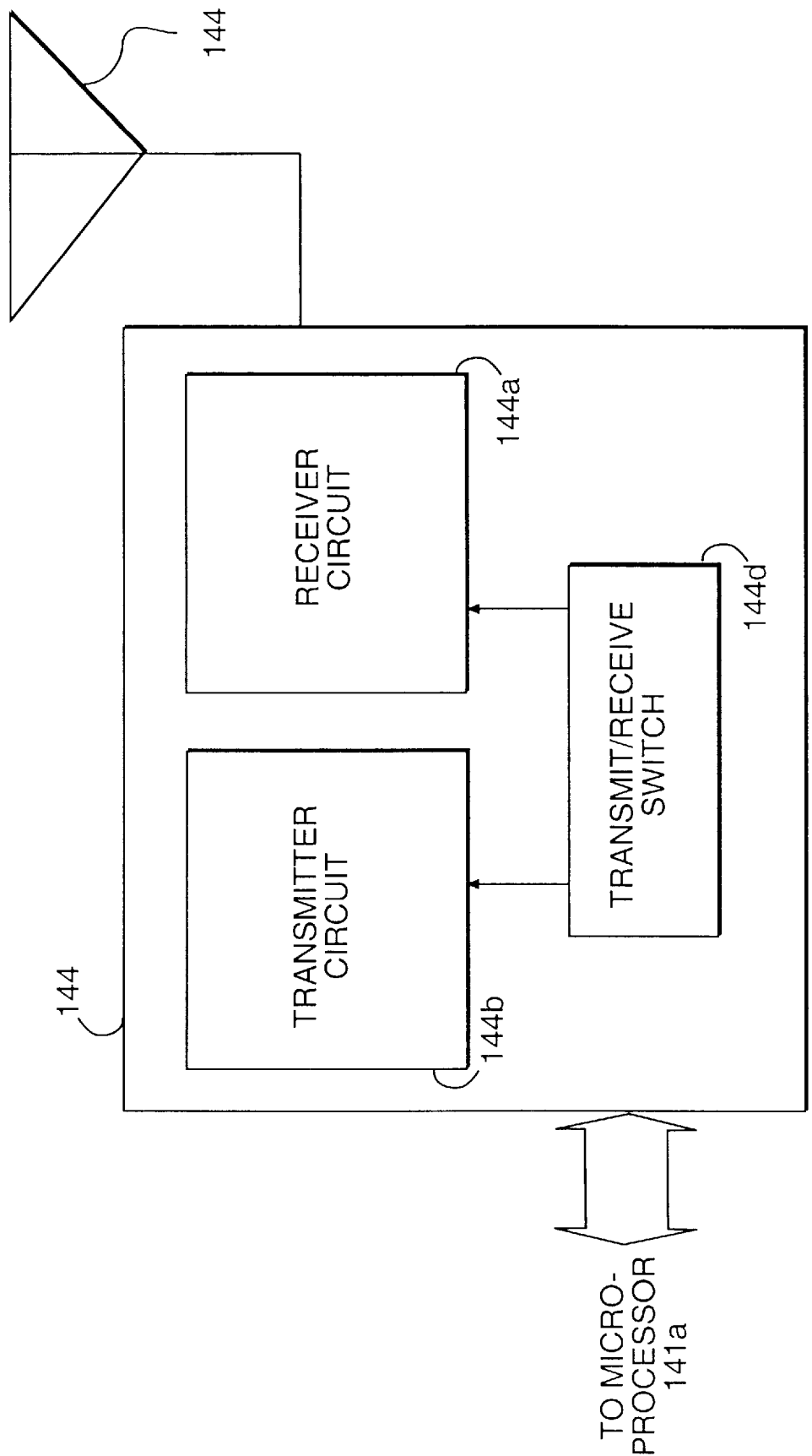
FIG. 3C shows a system block diagram of the components of the transceiver of the interrogator according to the embodiments shown in FIGS. 3A and 3B.

As shown in FIG. 3C, the transceiver 144 incorporated in both embodiments generally consists of a receiver circuit 144a and a transmitter circuit 144b controlled by the first microprocessor 141a in the interrogator 14. Both the transmitter 144a and receiver 144b utilize a common antenna 144c that, in this embodiment, consists of a standard ¼ wavelength monopole. Control of the transmitter 144a and receiver 144b includes a power management operation that is done to minimize current drain on the battery pack 146 when used in the transponder 16. The antenna 144c is coupled to the transceiver 144 through a diode transmit/receive switch 144d for switching the antenna 144c between a receive mode and a transmit mode. Control of the switching is done by the microprocessor 141a in both the first and second embodiments.

In both embodiments of the interrogator 14, the transceiver 144 operates in the 902 MHz to 928 MHz ISM frequency band under the FCC Rules Part 15.249. The transceiver 144 utilizes pulse amplitude modulation (OOK) for transmission, and log AM logarithmic detection for reception. The output power of the transmitter 144a is structured in accordance with Part 15.249 of the FCC regulations. The receiver 144b of the transceiver 144 is a superheterodyne type. The microprocessor 141a is connected to control the operation of the transceiver 144 through the power control circuit 145. Specifically, the microprocessor controls the power control circuit 145 to apply power for either transmitting or receiving, while controlling the diode switch 144d used for switching the antenna 144c between the transmitting and receiving modes.

In the transmitting mode, a signal to be outputted through the antenna 144c is sent from the microprocessor 141a to the transceiver 144. The microprocessor controls the diode switch 144d to have the transceiver 144 place the antenna 144c in the transmitting mode, and thereby route the signal accordingly. When in the receiving mode, a signal coming through the antenna 144c is routed to the receiver 144b of the transceiver 144. The receiver 144b demodulates and thresholds the received signal to provide a data output for the microprocessor 141a (in the first embodiment) or for both the first and second microprocessors 141a, 141b (in the second embodiment).

Figure 4:
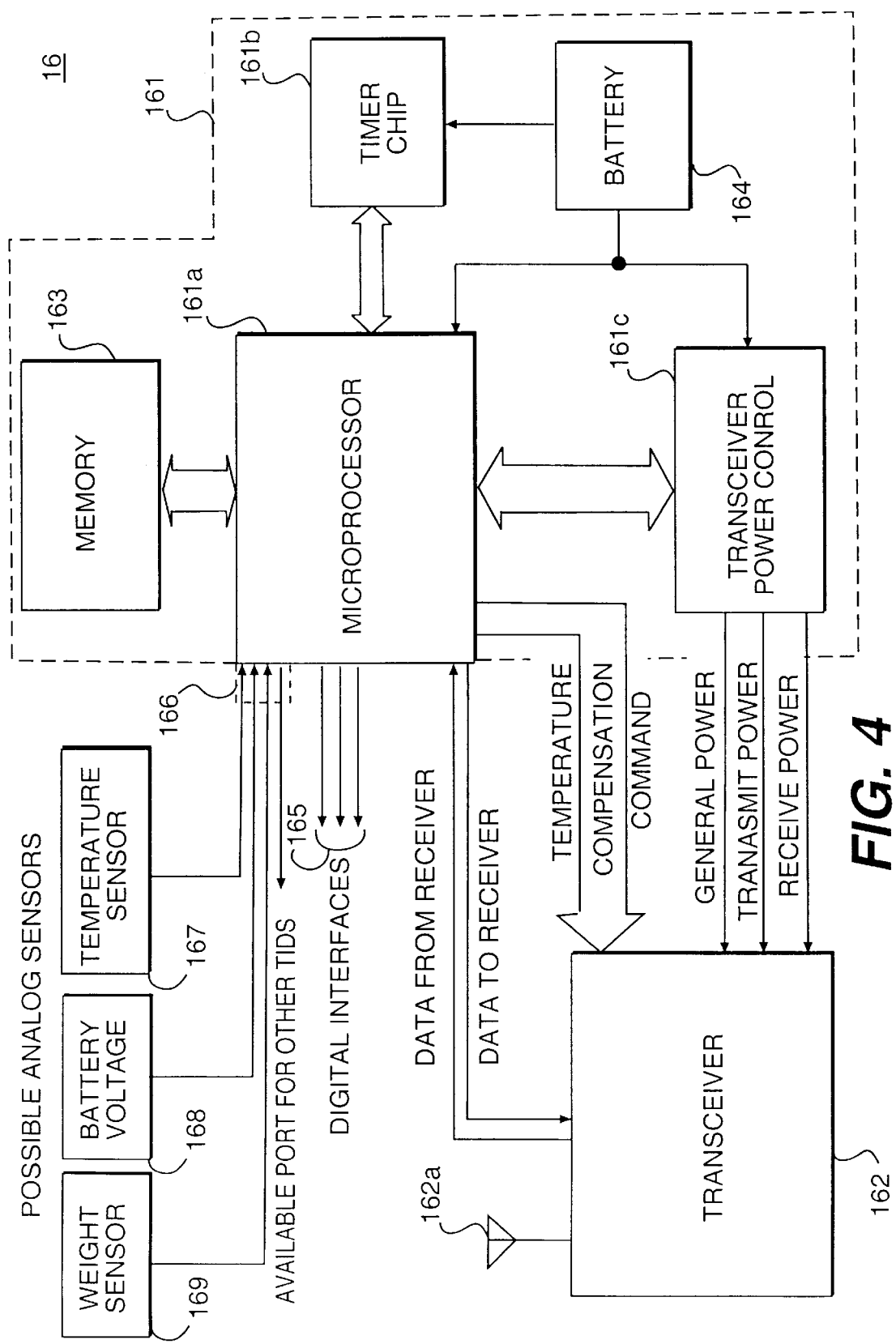
FIG. 4 shows a system block diagram of the components of the transponder according to the present invention.

As shown in FIG. 4, each transponder 16 generally consists of a digital controller board 161 containing a microprocessor 161a, a timer circuit 161b and transceiver power control circuitry 161c. Each transponder also includes a transceiver 162 with an antenna 162a and a long life battery 164. In this embodiment of the transponder 16, the microprocessor 161a is identical to that used in the interrogator 14 having internally 6 k of ROM and 128 bytes of RAM. The software control functions are executed from a program memory in the memory 163 in the form of a 8 k EEPROM.

The memory 163 also includes operational memory in the form of a 256 k SRAM. The operational memory is used to store data transmitted to the transponder 16 from the interrogator 14. The operational memory of the memory 163 provides the storage medium for information such as the contents of the container to which the transponder 16 is attached or any data pertinent to the container or item to which it is attached.

The timer circuit 161b serves as a master timer for generating a pulse every 500 msec. This pulse is used for synchronizing the wake up cycle for the transponder 16. The transceiver power control circuitry 161c supplies power to the transceiver 162 and controls the Transmit/Receive functions of the transceiver 162.

Depending on the type of microprocessor selected and the particular application for the system, the digital control board 161 for the transponder 16 may include both digital interface connections and analog-to-digital (A/D) input ports. In both of the above embodiments, the selected microprocessor includes four digital interface connections 165 and four input ports 166 for connecting with various peripheral devices such as external tamper indication devices (TID) and external sensor devices. As an example, FIG. 4 shows three of the A/D input ports connected to an internal temperature sensor 167, an internal battery status sensor 168, and a weight sensor 169 (e.g., connected to the item to monitor its contents). Other sensors and signal switches such as those for sensing or monitoring the condition of the surrounding environment, the condition of the containers/items being inventoried, the positions or orientations of the containers/items being inventoried, and the positions, orientations or proximity of objects near the containers/items being inventoried as known in the art may be connected through the digital interface connections 165 and input ports 166.

In the transponder 16, the microprocessor 161*a* performs multiple parallel functions. It stores the transponder ID code, receives and interprets messages from the interrogator 14, formats messages to be transmitted to the interrogator 14, and provides wake-up time information to the timer circuit 161*b*.

The timer circuit 161*b* is used to send power up and power down signals to the microprocessor 161*a* in order to minimize the total battery drain of the transponder 16 during operation. Each message from the interrogator 14 contains information for the timer circuit 161*b* to synchronize it with the interrogator 14. When an interrogation signal from the interrogator 14 is received with a time synchronization command, the microprocessor 161*a* resets the timer circuit 161*b* to insure that the next wake-up signal will occur just prior to the transmission of the next interrogation signal intended for that particular transponder when operating in the polling mode.

In this embodiment, the transceiver 163 is identical to that used in the interrogator 14, except for the transmitting and receiving modes and functions operating opposite to those currently operating in the interrogator 14.

The specific type of long life battery 164 used in the transponder 16 may vary dependent upon the requirements of the particular application. As an example, a lithium battery with a rating of 3000 maH is used in the present embodiment, wherein a polling mode of operation is being conducted. In this particular polling operation, interrogation of the transponders 16 is being done once every 5 minutes, thereby allowing each transponder 16 to have an operational life of more than three years. For aperiodic operations, battery life will depend on the number of times that data transfers are made. The frequency of data transfers will determine the overall powered-up operation of the transponders 16.

As discussed above, the system of the present invention has at least two modes of operation: a periodic or polling mode of interrogation and an aperiodic or random mode of interrogation. These two modes will be described in further detail hereinbelow.

Polling Mode of Operation

If, during the initial entry of operating parameters 121 and program instructions, the operator inputs instructions selecting a periodic/polling mode of operation, the main processor 122 will generate the necessary commands for the system controller 12 to output a start command to the interrogator(s) 14. When the start command is received, the interrogator(s) 14 initiate a process of enrolling the transponders 16.

Enrollment involves a process of establishing communications with each transponder 16 and then transmitting the necessary commands to synchronize each transponder's wake up cycle with the interrogation cycle of the interrogator 14. The enrollment process is a part of the fixed, preprogrammed instruction set stored in the program memory of the first and second memories 147, 148 of the interrogator and the fixed, preprogrammed instruction set stored in the program memory of each transponder's memory 163.

Figure 5:
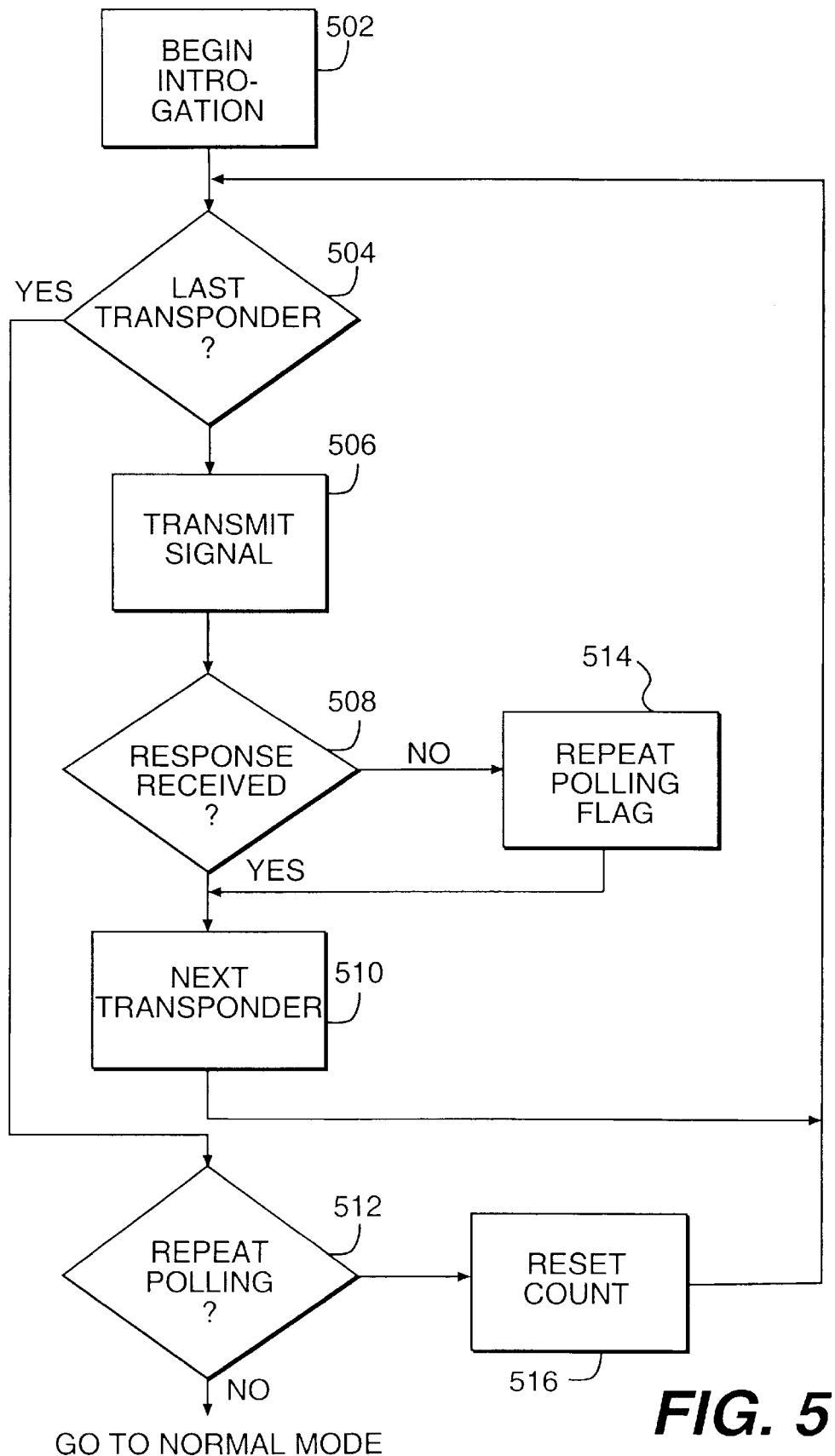
FIG. 5 shows a flow chart illustrating the operation of the interrogator during enrollment according to a first embodiment of the present invention.

As shown in FIG. 5, the enrollment starts with the interrogator 14 broadcasting a signal to the transponders 16 (Step 502). Each signal that is broadcast contains a specific identification number of a transponder 16 in a sequence established by an operator during the initial inputting of the operational parameters 121 and other initial or start-up programming into the system controller 12. The interrogator 14 will transmit a signal for 100 ms directed to a specific transponder 16 (Steps 504, 506), and then listen (i.e., switch to a receiving mode) for a preset polling time interval to determine if the selected transponder 16 will respond (Step 508). If the selected transponder 16 does not respond, the interrogator 14 sets a flag to signal that the polling must be repeated (Step 514). At the end of that period, the interrogator 14 will transmit to the next selected transponder 16 (Step 510). Again, the interrogator 14 will wait in its receiving mode for the preset polling time interval, and then transmit a signal for the next transponder 16 (Steps 504, 506, 508, 510). These steps of the process will continue to repeat until all transponders 16 have replied and acknowledged receipt of the command message from the interrogator 14. Otherwise, the transponders 16 will be polled again in sequence (Steps 512, 516, 504). The timing of these interrogations will be determined by the pre-set interrogation interval and the number of transponders 16 to be interrogated. In this embodiment of the invention, the minimum interrogation interval for each transponder is 500 milliseconds.

Figure 6:
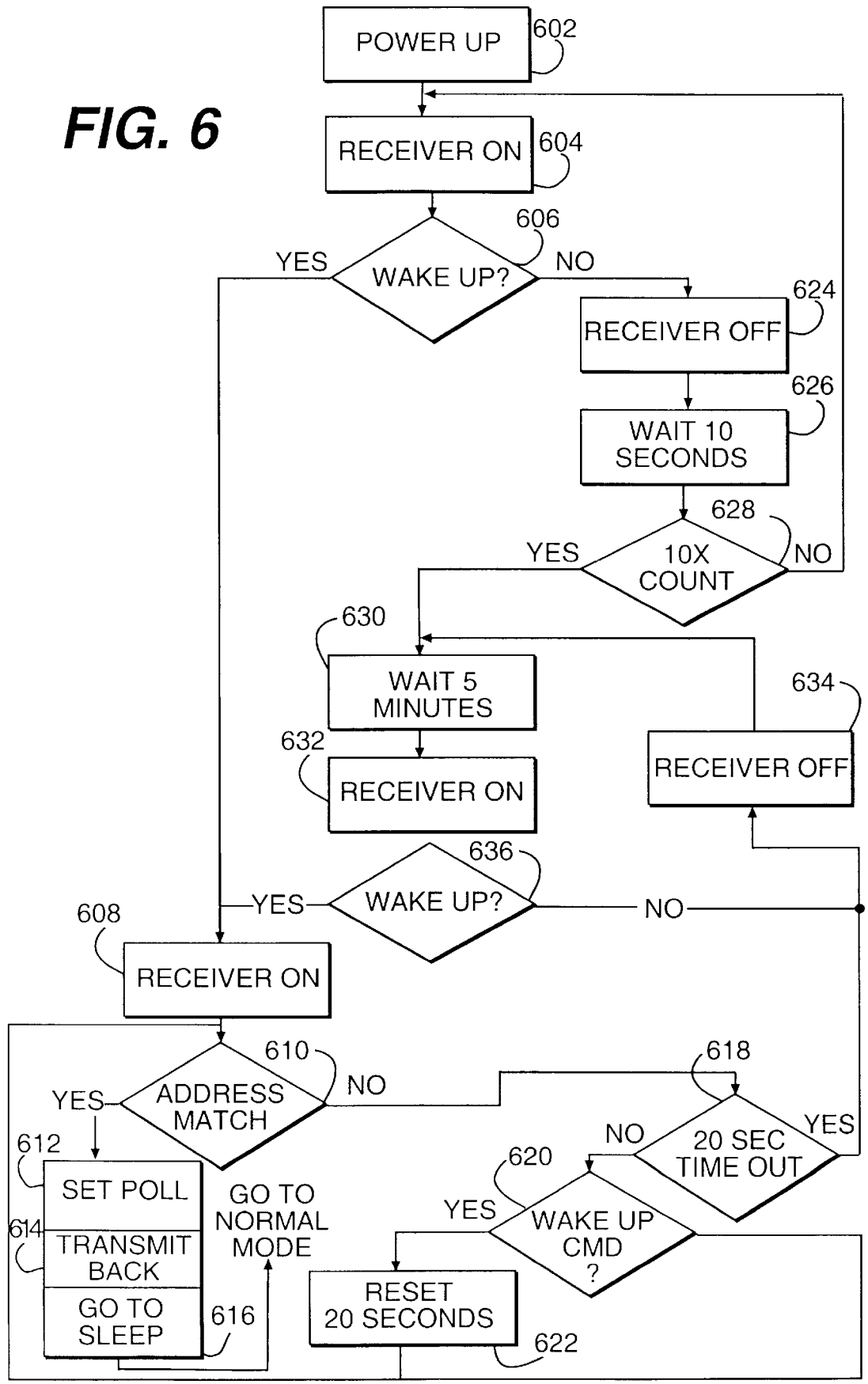
FIG. 6 shows a flow chart illustrating the operation of the transponder during enrollment according to the polling mode of operation in a first embodiment of the present invention.

As illustrated in FIG. 6, the transponders 16 automatically begin a listening sequence for enrollment whenever power is first applied to the transponder (Step 602), wherein the transponders automatically start up in the receiving mode. In this initial receiving mode, upon its initial powering up, a transponder 16 will initially set its transceiver 162 in the receive mode (Steps 604, 606), and begin "listening" or monitoring for the presence of a signal from the interrogator 14. If a signal having the protocol and data structure that the transponder 16 recognizes as a signal from the interrogator 14 is received, the transponder 16 will then initiate a wake up command (Step 606), and maintain its transceiver 162 in the receiving mode (Step 608).

When the transponder 16 does receive command signals containing an ID number, the transponder will determine whether the ID number or address in the received signals matches with its programmed ID number (Step 610). If the proper ID is received, the transponder 16 will accept the message and initiate the commands in the message. Specifically, the transponder 16 will synchronize its timer circuit 161*b* to generate wake up commands at the polling time based on the data in the message (Step 612), transmit a reply to the interrogator 14 (Step 614) and then initiate a normal sleep (i.e., minimally active) mode (Step 616) wherein only the timer circuit 161*b* is operating and controlling the waking up of the transponder 16 in a normal polling mode (see FIG. 7).

If the command signals received from the interrogator 14 contain an address that does not match the ID number of the transponder 16, the transponder will initiate a timer to time a wait time period (Step 618) and then listen for other command signals to be transmitted from the interrogator 14 (Step 620). During the wait time period, the transceiver 162 is still maintained in the receiving mode. In this embodiment, the wait time period is set for 20 seconds. If within the wait time period another command signal is received, the transponder 16 will then reset the wait time period timer (Step 622) and again determine whether the received address matches its ID number (Step 610). If a non-matching ID number is again determined, the transponder will re-initiate the wait time period timer and wait to receive another command signal. As long as the transponder 16 receives a command signal within the wait time period, the transponder will repeat this procedure until a command signal with the proper address matching the ID number of the transponder is received.

If the wait time period timer runs out without receiving any command signal from the interrogator 14, the transponder will shut down its transceiver from the receiving mode (Step 634) and enter a second sleep mode, wherein a second timer is activated to time out a second wait time period (Step 630). In this embodiment, the second wait time period is set at five (5) minutes. At the end of the second wait time period, the transponder activates its transceiver in the receiving mode (Step 632) and once again monitors for the presence of signals from the interrogator 14. If signals are detected, the transponder 16 repeats the process of determining whether command signals with the proper address are received (Steps 636, 610–622). Otherwise, if no signals from the interrogator 14 are present, the transponder shuts down and repeats the process of the second sleep mode and waking up to monitor for signals (Steps 634, 630, 632, 636).

If no signal from the interrogator 14 is detected during the initial receiving mode after the transponder's first powering up, the transponder instead of waking up (Step 606) will shut down the transceiver 162 from the receiving mode (Step 624) into the second sleep mode, and activate a third timer with a third wait time period (Step 626). In this embodiment, that third wait time period is set at ten seconds. After the third wait time period has run, the transponder 16 will first determine if the third wait time period has already run a predetermined number of cycles, in this case ten cycles (Step 628). If not, the transponder 16 will reinitialize into a receiving mode for the transceiver 162 and begin monitoring for the presence of signals from the interrogator (Steps 604, 606).

However, if the third wait time period has run more than the predetermined number of cycles, the transponder will continue with the second sleep mode and cycle through the process of activating the second timer to time out a second wait time period (Step 630), activating the transceiver 162 in the receiving mode (Step 632) and then monitoring for the presence of signals from the interrogator 14. If signals are detected, the transponder 16 will again repeat the process of determining whether command signals with the proper address can be received (Steps 636, 610–622). If no signals from the interrogator 14 are present, the transponder will shut down and maintain the process of the second sleep mode and waking up to monitor for signals (Steps 634, 630, 632, 636).

Referring to FIG. 5, as each transponder 16 is interrogated, the results of that interrogation are reported via the RS-232 communications bus interface 143, 123 to the system controller 12. If a transponder 16 does not reply to an interrogation, a signal indicating that no response was received will be sent to the system controller 12. If a transponder does reply, the reply data 16 from that transponder will be reported via the RS-232 communications bus interface 143, 123 to the system controller 12, and that transponder 16 will be considered enrolled in the polling sequence.

As described above, the transponders 16 are programmed to begin a repeated monitoring and wake up sequence for a second wait time period (e.g., every ten seconds) when power is first applied. This period is set to facilitate the rapid acquisition of new transponders to the system. Since such a rapid sequence would deplete the battery 165 if continued for a long period of time, the monitoring and wake-up cycle defaults to every 5 minutes (Steps 630–636) if the transponder 16 is not acquired by the interrogator 14 within 10 cycles (Step 628) of the sequence. In this embodiment, the five minute wait time period is actually set to slightly less then 5 minutes to improve the likelihood of acquisition by the interrogator 14 by providing a very slight offset from the expected interrogation period.

Figure 7:
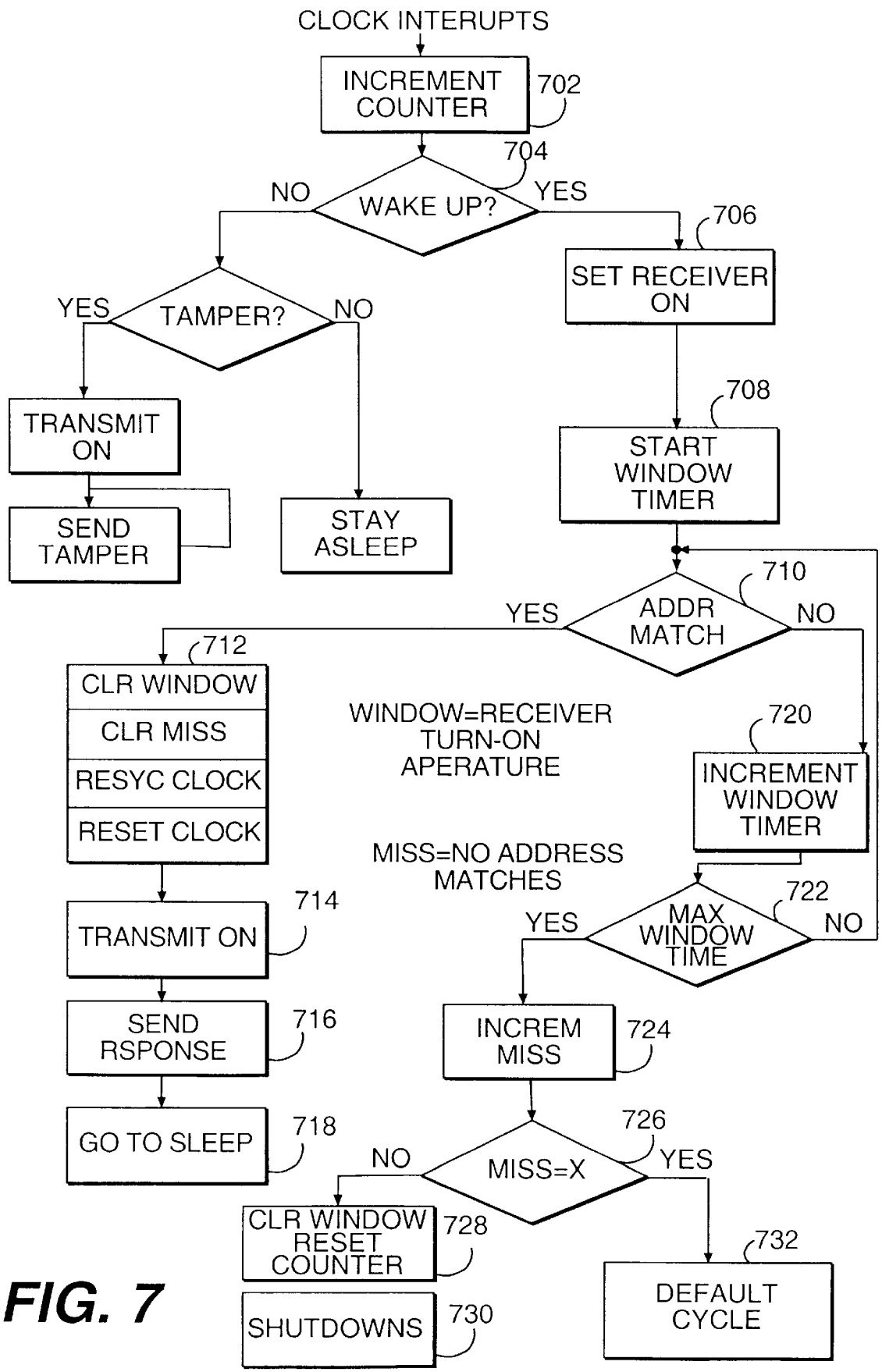
FIG. 7 shows a flow chart illustrating the operation of the transponder during an interrogation sequence according to the polling mode of operation in the first embodiment of the present invention.

When all the transponders 16 are enrolled into the system, the timing of the transponders for waking up and being polled is synchronized and the transponders 16 begin the normal mode of operation illustrated in FIG. 7. In this normal operational mode, based upon the command signal from the interrogator 14, the timer circuit 161*b* increments a counter for X clock periods (Step 702). The value of X is based on the data last received by the transponder 16 from the interrogator 14. Once the counter counts the predetermined X number of clock signals, the transponder 16 will wake up (Step 704) and the transceiver 162 will activate its receiving mode (Step 706) to listen or monitor for a signal from the interrogator 14. In addition, a window timer is activated (Step 708) for a predetermined period. If the signal is received and the ID number matches the transponder 16 (Step 710), the transponder 16 processes the signal (Step 712), activates the transmit mode (Step 714) and sends a reply (Step 716), and reverts back to the normal sleep mode (Step 718) for the remainder of the polling period.

In the step of processing the signal (Step 712), the transponder 16 clears or resets a counter for the number of times the transceiver 162 is activated and set to the receiving mode, clears a counter for how many times an address of a signal from the interrogator 14 does not match the transponder's ID number, resynchronizes the timer circuit 161*b* with the timer circuit 142 of the interrogator 14, and resets the timer circuit 161*b* for timing the polling time interval. In resynchronizing and resetting the timer circuit 161*b*, part of the signal from the interrogator 14 may be data for a new polling time interval or period that the transponder 16 stores and implements when it goes back to the sleep mode.

If the ID number does not match the transponder 16, the transceiver 162 is maintained active in the receiving mode in order to monitor again for a signal with a matching address. In addition, the window timer is incremented (Step 720) and the transponder determines whether the window timer has timed out (Step 722). If a signal is detected before the window timer times out, the transponder 16 will repeat the determination for a proper address in the signal (Step 710), and then proceed with the process of resynchronization (Step 712), transmitting a reply (Steps 714, 716) and going to sleep (Step 718). If no signal is received before the window timer times out, the no matching-address-counter will be incremented (Step 724). The number of times that an address did not match the transponder's ID number is the number of missed communication periods. However, for as long as the window timer is still incrementing to its predetermined value and no signal is received, the transponder 16 will repeatedly monitor for a signal from the interrogator 14 that matches its ID number and increment the window timer.

If the no-matching-address counter is incremented (Step 724), the transponder 16 will then determine if that counter has reached its predetermined maximum value (Step 726). If that predetermined maximum number is reached, the transponder 16 will default to cycling in the enrollment mode of operation in order to be re-acquired in the polling sequence (Step 732). Otherwise, the transponder will clear the window timer and reset the no matching address counter (Step 728). Afterwards, the transponder 16 will revert to the sleeping mode (Step 730) and wake up at the next polling time interval based on the last known data in memory.

In the operation of the transponder 16 for this embodiment, each of the timers and counters described are implemented via software internal to the operation of the microprocessor 161*a* in a manner as would be known in the art.

As data is received by the interrogator 14 from the transponders 16, the data is transferred via the RS-232 communication bus interface 143, 123 to the system controller 12 where the data is processed and translated into the desired format for display and/or for storage in a memory device connected to the system controller (e.g., a standard computer magnetic disc drive). When a transponder 16 fails to report during a scheduled polling cycle, the interrogator 14 issues an immediate warning of a missing transponder 16 to the system controller 12.

For those transponders 16 with tamper indication devices attached, it is possible for the transponder to be activated by the occurrence of tampering. While a transponder 16 is in its sleep mode, the microprocessor 161a is periodically sampling its digital interface connections 165 and/or its A/D input ports that are connected to sensors or TIDs. When a TID, for example, signals that tampering has occurred (Step 734), the transponder 16 will begin sending an alarm signal every 500 msec (Steps 736, 738). Otherwise, the transponder will remain in its normal sleeping mode (Step 740).

Figure 8:
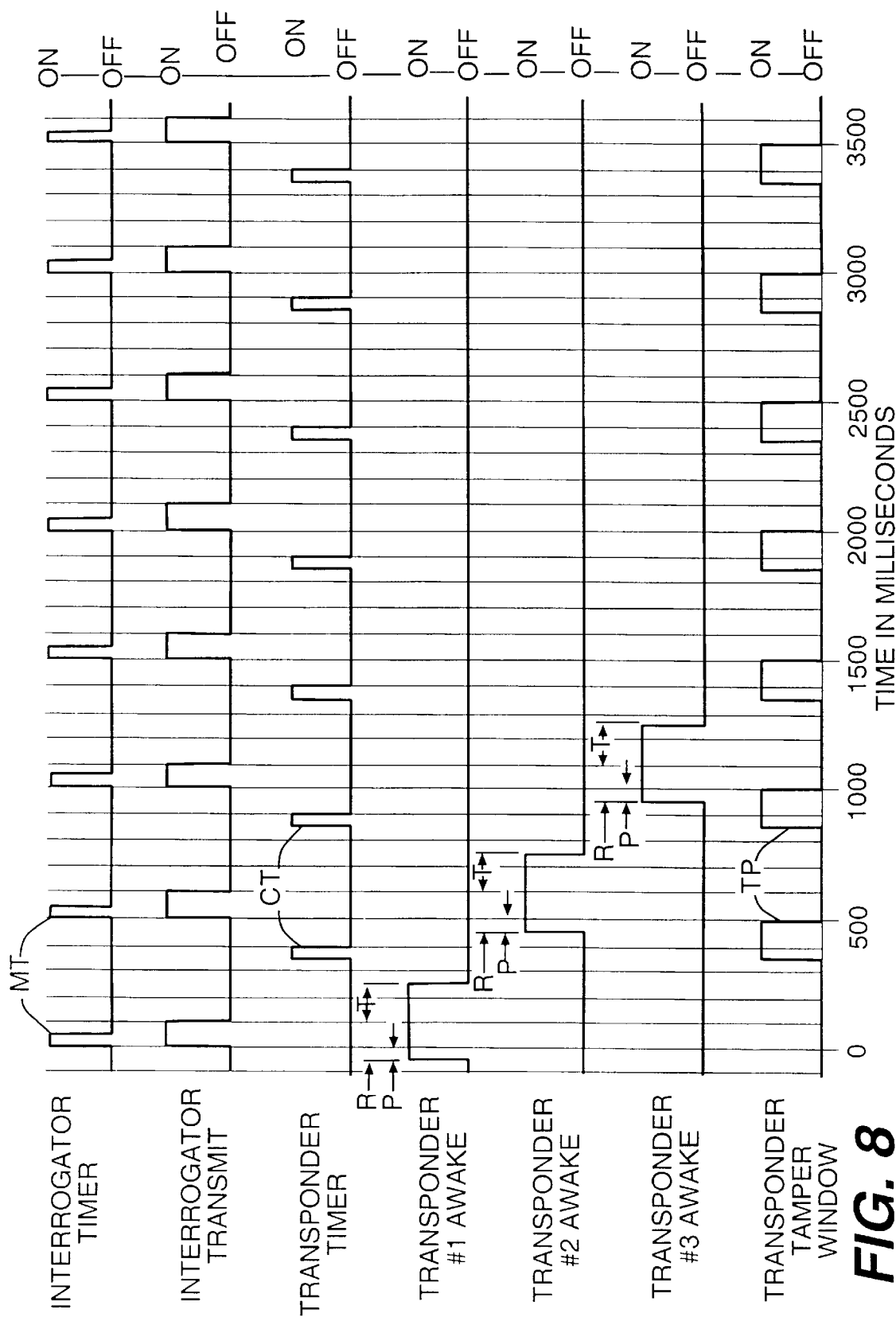
FIG. 8 shows a timing diagram illustrating the polling operation of the interrogator with the transponders according to the first embodiment of the present invention.

FIG. 8 is a diagram showing example timing sequences during the polling mode of operation with the transponders 16 being polled every 500 msec. The master timer for the operation is the interrogator's master clock timer 142 which issues a 50 ms pulse MT every 500 msec. This pulse MT turns the transmitter 144a of the interrogator 14, thereby initiating the transmission of the request for the next transponder 16 in the sequence to respond. The clock pulses CT of the timer circuits 161b in each of the transponders 16 are synchronized with the pulses MT of the master clock timer 142 in the interrogator 14, but with an offset of 250 msec.

As illustrated, the timer circuits 161b in the transponders 16 cause the transponders to wake up in sequence and to begin listening or monitoring for a transmission from the interrogator 50 msec prior to the actual transmission of the interrogation signals from the interrogator 14. This period P is set to allow for variations in the timers and possible drift during the periods when the transponders 16 are asleep. When a transponder 16 is awakened by its timer circuit 161b, the transceiver 162 is activated in the receiving mode for a 150 msec period R during which any message received gets processed by the transponder 16 as described above. If a valid message (i.e., a signal with a matching address) is received during this time period, the transponder 16 immediately switches (see FIG. 7) to the transmit mode for the next 150 msec period T and sends a reply to the interrogator. This process is repeated for all the other transponders 16 in sequence. The entire cycle then repeats for all the transponders 16.

The timer circuits 161b in the transponders 16 also generate sampling pulses SP (not shown) which the transponder 16 uses to sample the digital interface connections 165 and/or the A/D input ports 166 and read any data from the connections/ports every 500 msec. This sampling method of reading sensors permits the transponders 16 to monitor their connections/sensors with a very small power demand on the battery 165. The duty cycle for this sampling is 1/1000 of the time.

If, for example, any of the sensor ports 166 of the transponders 16 are used for tamper indicating devices, they are also sampled at the same period. If tampering is detected in any of the transponders during any of the sampling periods, the transceiver 162 of the tampered transponder is activated in the transmitting mode and a tamper alarm message is immediately generated. This alarm message is sent to and received by the interrogator 14 during the transponder tamper window periods TP.

Aperiodic Data Transmission and Retrieval Mode of Operation

The aperiodic mode of operation is used when communications to and from the transponders 16 is done on an as-required basis only. This mode of operation will most often be used in applications that require the sending and receiving of data regarding the material being monitored.

Figure 9:
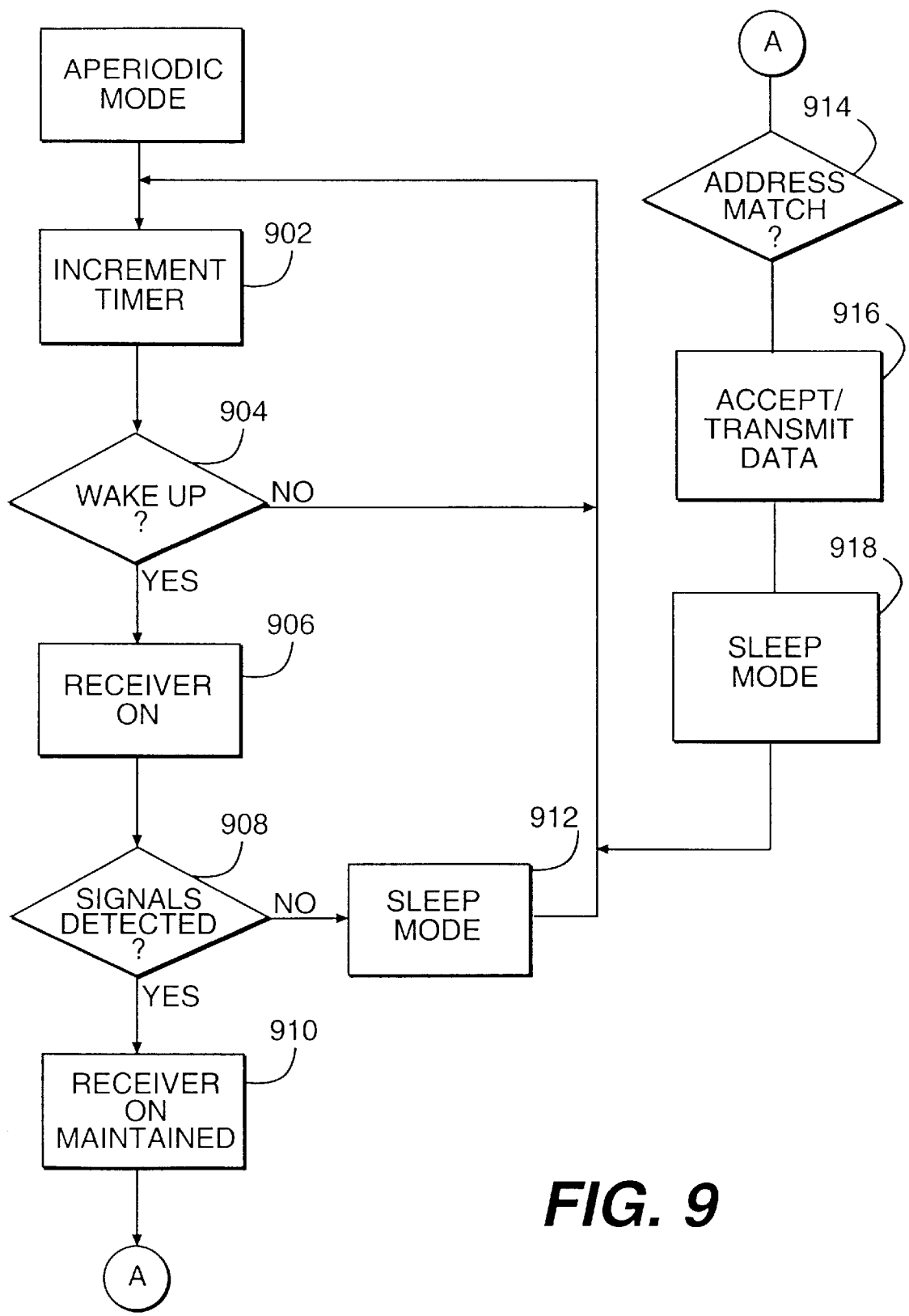
FIG. 9 shows a flow chart illustrating the operation of the transponder during an interrogation sequence according to the aperiodic mode of operation in the first embodiment of the present invention.

In the aperiodic mode of operation, as illustrated in FIG. 9, the transponders 16 are awakened at preset intervals for predetermined periods of time as determined in the operating program of the transponders. For example, the transponders may be set to awaken in 0.5 second intervals for 1 second. The transponders 16 may be programmed for any desired interval or time period. In this mode of operation, there is no enrollment of transponders as was necessary for the polling mode.

Operationally, the timer circuit 161b in each transponder 16 will increment a timer set for the preset interval (Step 902). At the occurrence of a preset interval (Step 904), the transponders 16 as programmed will wake up for their predetermined wake-up periods (in this embodiment, 10 msec), activate their transceivers 162 in the receiving mode, and then listen or monitor for the presence of an interrogator signal from the interrogator 14 (Step 906). If a signal is detected, the transponders will remain ON with their transceivers 162 still in the receiving mode (Steps 908, 910). If a transponder 16 then receives a command message with an address that matches its ID number (Step 914), it will then accept the instructions in the command message from the interrogator 14 to either remain ON and accept a data transfer, or remain ON and transmit requested data contained in its memory (Step 916). Afterwards, the transponder 16 will default back to the normal sleeping cycle and wake up at the next preset interval (Steps 918, 902)

If no interrogation signals from the interrogator 14 are detected (Steps 904, 906), the transponder 16 will default back to the normal sleeping cycle and wake up at the next preset interval (Steps 912, 902) in order to re-acquire a signal from the interrogator 14. Also, if an address matching the transponder's ID number is not found in the received command message, the transponder 16 will default back to the normal sleeping cycle and wake up at the next preset interval (Steps 918, 902) in order to re-acquire a signal from the interrogator 14.

System Communications and Protocol

RF communication between the interrogator 14 and the transponders 16 is accomplished by a special communication protocol based upon formatted packets of data which is the modulating signal used to generate the OOK signal modulation employed as the RF medium. This protocol is built around the timing sequence of the system which is designed to minimize power consumption from the battery in the transponder. Communications between the interrogator and the transponders occur as either a basic interrogation to determine the presence of the transponders or to transfer data.

In the polling mode of operation, the interrogation signal that is first sent may consist of a 121 bit packet having, for example: (1) 25 synchronizing bits; (2) 72 bits for the address/ID number, clock synchronization and any other commands; and (3) a 24-bit checksum. This packet of data in the interrogation signal may be sent six times within a 50 millisecond time period. As each packet is received at a transponder 16, the validity of the packet is checked by verifying the checksum on each packet. The repetition of the data six times creates a second level of error checking at the transponder 16 by assuring that the checksum verified packets received match one another.

Once an interrogation signal is received and verified by the transponder as valid for its ID number, the transponder 16 will then transmit back to the interrogator 14 the same packet of information plus data from the interface connections or A/D input ports. In this embodiment, this return message is 256 bytes long and is transmitted six times within a 150 msec period.

If the interrogation command contained a request to the transponder to receive data or to return stored data, the transponder will then respond by either staying awake to receive data or will immediately begin to transmit data if that was requested. The data to be transfer is that data that can be stored in the additional 256K bytes of memory in the transponder.

Data transfers are done in 256 byte packets which includes the synchronizing bits, the data and the checksum. The effective data transfer rate for the general embodiment of the invention is 9,600 bits per second. Each packet of data is error checked as it is received and acknowledged as valid or requested to be resent. This method of packet-by-packet verification minimizes the probability of having to re-transmit large blocks of data when only a small segment has an error.

The communication protocol used in this invention accomplishes the requirement of rapid data transfer and minimal power consumption from the transponder battery by keeping transmissions between the interrogator 14 and the transponders 16 as short as possible.

Power Saving Techniques

The features of the invention directed to extending the life of the battery 164 in the transponders 16 are based on (1) the design of the hardware and (2) the concept of operation which places the transponders in a powered down state for long periods of time relative to their operating times. With respect to the hardware design of the transponders 16, very low current devices as known in the art are selected and incorporated in the transceiver 162 and digital controller boards 161 of the transponders.

For example, the use of a single oscillator in the transceiver to act as the local oscillator for both receiving and transmitting functions through the use of a diode switch reduces the amount of circuitry required, thereby minimizing current consumption in the transceiver.

In addition, the interrogators and transponders use a low noise figure superheterodyne receiver design, as illustrated in FIG. 3B, in their transceivers. The use of this type of sensitive receiver permits the system to operate at the desired distances between the interrogators and transponders while using a minimum of transmitter power. Further, the use of a very low powered transmitter design in their transceivers results in low current drain from the battery and allows the system to be compliant with Part 15.249 of the FCC Code.

The use of timer circuit 161*b* external to the microprocessor 161*a* is a key factor in achieving the low battery drain of the transponders 16. The timer circuit 161*b* is configured to be the only device that is fully active during all of the time the transponder 16 is operational. In the present embodiments of the invention, the timer circuit draws less than 10 microamps.

Microprocessors that are rated as consuming only a few milliamps when fully active (i.e., awake) and approximately 1 microamp when minimally active (i.e., asleep) are selected for use in the transponders. As noted in the above descriptions of the various embodiments, 8051 derivative microprocessors manufactured by Intel are used.

In conjunction with using components that operate at low levels of current consumption, the receiver and the transmitter functions of the transceivers and interrogators are operated at very low duty cycles. For example, in the present embodiment, when polled at five minute intervals, the transceiver of the transponder 16 is ON a total time of 300 msec every five minutes or a 0.1% duty cycle.

Also, the microprocessors in the transponders, as described above, are cycled between a sleep state and an active state. In addition to the same waking periods as the transceivers, the microprocessors also wake up every 500 milliseconds for a period of 200 to 500 micro-seconds to collect data from their digital interface connections and the A/D input ports.

The power conservation methodology for transponders using the polling mode of operation, as described above, also applies to the operation of the transponders in the aperiodic mode. In particular, control of circuitry that is ON at any given time is controlled by the preprogrammed operational instructions in the EEPROM of the controller circuit of the transponder.

Example Implementation of Transceiver

Figure 10A:
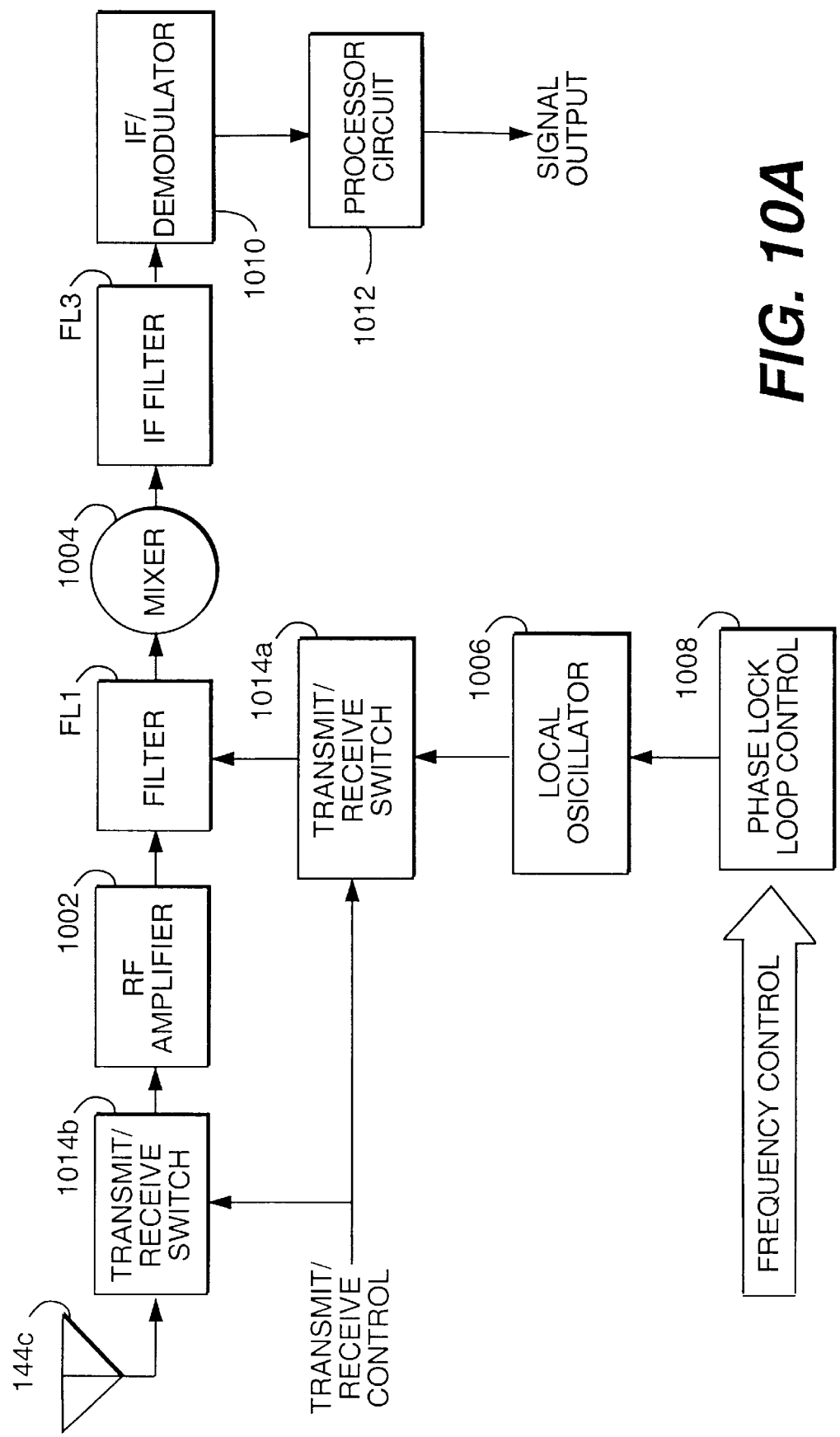
FIGS. 10A and 10B illustrate a block diagram and a circuit diagram, respectively, of the transceiver portion of the interrogator and the transponder according to one implementation for the first embodiment of the present invention.
Figure 10B:
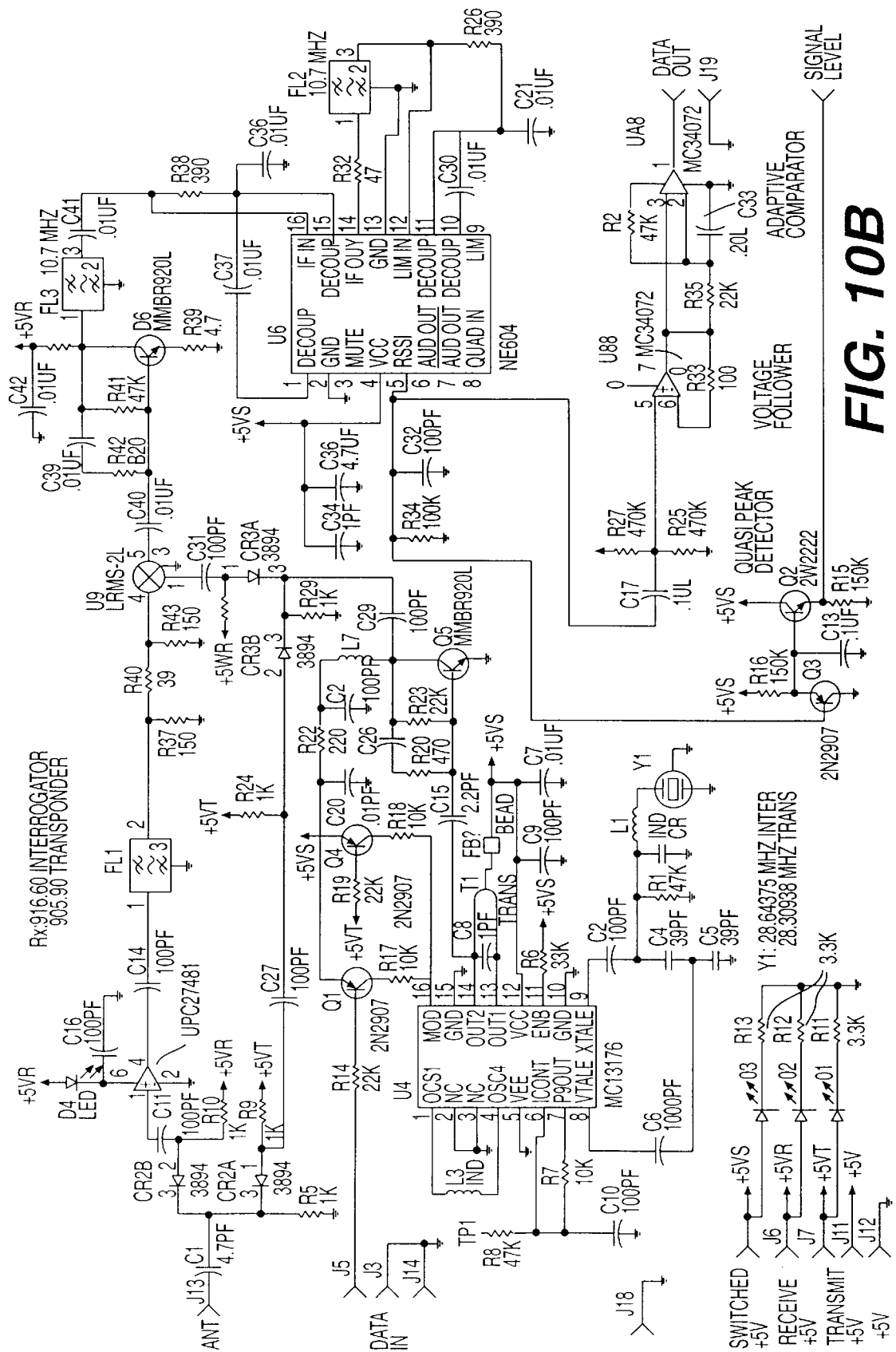

In a specific implementation of a transceiver circuit used in both the interrogator 14 and the transponder 16, as shown in FIGS. 10A and 10B, a signal received by the antenna 144*c* passes through a low noise circuit 1002 based on an amplifier U5 where it is amplified and routed through a filter FL1. The filter FL1 reduces the noise bandwidth of the receiver and attenuates the image frequencies that would be present in a standard superheterodyne receiver. The received signal is then coupled to a mixer circuit 1004 based on a mixer device U9 where it is multiplied with a signal from a local oscillator 1006 based on an integrated circuit U4 to generate a 10.7 MHz Intermediate Frequency (IF) signal. The IF signal is amplified by the integrated circuit Q6 and filtered by a filter FL3 before entering the IF demodulator circuit 1010 based on the integrated circuit U6.

The IF signal undergoes additional amplification inside integrated circuit U6 and is further filtered by filter FL2 that is part of the processor circuit 1012. Demodulation of the OOK signal is accomplished inside U6. The demodulator device based on the integrated circuit U6 is a true logarithmic detector and therefore produces an amplitude output directly proportional to a received signal level.

In the processor circuit 1012, the demodulated signal from the integrated circuit U6 is next passed to thresholding circuitry combining the circuits of U8A and U8B, where the circuit U8B is a voltage follower and U8A is an adaptive comparator. The thresholding circuitry senses the power level of the demodulated signal outputted from the integrated circuit U6 and sets a threshold voltage level just above the system noise level. When the signal input to the receiver 144*b* is ON, the demodulated signal will exceed this threshold level resulting in a positive output signal from the circuit U8A. The resultant output of this threshold "slicer" circuitry is a data stream of zeroes and ones corresponding to the OFF and ON states of the received signal.

The local oscillator signal used to drive the mixer U9, is generated by an integrated circuit U4 in the local oscillator circuit 1006. The frequency of this oscillator is determined by the quartz crystal Y1. The crystal Y1 is resonant at a frequency that, when multiplied by 32, obtains the desired operating frequency in the 902 to 928 MHz band. An oscillator built into the mixer U9 is resonated by the transistor T1 and the capacitor C8 to the desired frequency in this ISM band. This internal oscillator is locked to the crystal frequency through a "divide-by-32" PLL circuit 1008.

The resultant phase locked oscillator signal is then amplified by amplifier Q5 and passed to a diode switching circuit 1014a, 1014b consisting of CR3A and CR3B. This switch permits the signal to be routed either to the mixer U9 for receiver operation or to be routed to the antenna switch 144d consisting of the switching circuit of CR2A and CR2B for use as a transmitted signal.

In the transmitting mode, the IF portion of the transceiver 144 consisting of the integrated circuit U6, the RF amplifier U5, the slicer circuit U8A/B and the IF amplifier Q6 are turned OFF. The oscillator circuit U4 is activated. The output of the circuit U4 is amplified by amplifier Q5 similar to that done when operating as part of the local oscillator. In the case of the transmitter mode, the transistors Q1 and Q4 receive a data signal from the first microprocessor 141a and generate a modulation signal that gates the output of the oscillator circuit U4 ON and OFF to create the OOK signal. The diode switching circuit of CR3A and CR3B are biased to route the signal to the antenna switch circuit of CR2A and CR2B which are biased to route the signal to the antenna 144c for radiating out.

Although the present invention has been fully described in connection with the preferred embodiment thereof with reference to the accompanying drawings, it is to be noted that various changes and modifications will be apparent to those skilled in the art. For example, different types or sizes of memories may be used for implementing the program and operational memories depending on the particular application using the system. In particular, EEPROMs larger than 8 k and SRAMS larger or smaller than 256K may be used. Different microprocessors with different processing and peripheral interface capabilities may be used to tailor the system to particular applications. Such changes and modifications are to be understood as included within the scope of the present invention as defined by the appended claims, unless they depart therefrom.

We claim:

1. A system for remotely monitoring and tracking a plurality of units of inventory, comprising:

a plurality of transponders each fixedly mounted onto a corresponding unit of inventory;

at least one interrogator located remotely from said plurality of transponders, said interrogator having means for conducting two-way communication with each of said transponders, and each of said plurality of transponders having means for conducting two-way communication with said interrogator; and means for controlling operation of said interrogator whereby said interrogator controls operation of each of said plurality of transponders, wherein said interrogator includes means for periodically transmitting an interrogation signal to each of said plurality of transponders, each of said plurality of transponders includes means for controlling operation of said transponder between one of a fully active state and a minimal power conserving state, and means for monitoring for the presence of interrogation signals from said interrogator during said minimal power conserving state, and means for processing said interrogation signal and transmitting data signals to said interrogator in response to said interrogation signal in said fully active state, said data signals including data on at least one of a status, content, and description of said unit of inventory to which a corresponding one of said plurality of transponders is attached, said means for monitoring for the presence of interrogation signals includes a transceiver circuit having a signal receiving mode of operation for receiving said interrogation signals during said minimal power conserving state, and said means for controlling operation of said transponder includes a first timer circuit for timing when to alternatingly energize and de-energize said transceiver circuit into and out of the signal receiving mode, respectively, during said minimal power conserving state.

2. A system according to claim 1, wherein said means for processing said interrogation signal and transmitting data signals includes said transceiver having a transmitting mode of operation in said fully active state whereby each of said plurality of transponders transmits said data signals in response to said interrogation signal.

3. A system according to claim 1, wherein said data signals transmitted by said means for processing said interrogation signal and transmitting data signals further include an acknowledgement signal verifying a presence of each of said plurality of transponders and a corresponding one of said units of inventory.

4. A system according to claim 1, wherein said data signals further include a warning/alarm signal.

5. A system according to claim 1, wherein said interrogator further includes means for receiving data signals from said plurality of transponders and means for processing said data signals in response to receiving said data signals.

6. A system according to claim 1, wherein said interrogator further includes means for transmitting interrogation signals directed to specific ones of said plurality of transponders in sequential order.

7. A system according to claim 6, wherein said interrogation signal from said interrogator includes an address of a specific one of said plurality of transponders whereby only said specific one of said transponders responds to said interrogation signal.

8. A system according to claim 7, wherein said interrogation signal from said interrogator further includes timing instructions and data for synchronizing operation of said specific one of said plurality of transponders with said interrogator.

9. A system according to claim 7, wherein said interrogation signal from said interrogator further includes instruction signals instructing said specific one of said plurality of transponders to transmit said data signals.

10. A method for remotely monitoring and tracking a plurality of units of inventory, comprising the steps of:

providing a plurality of transponders each fixedly mounted onto a corresponding unit of inventory;

providing at least one interrogator located remotely from said plurality of transponders;

providing control data and instructions for controlling operation of said interrogator whereby said interrogator controls operation of each of said plurality of transponders;

periodically transmitting an interrogation signal to each of said plurality of transponders from said at least one interrogator; and alternatingly operating each of said plurality of transponders between one of a fully active state and a minimal power conserving state, said step of alternatingly operating said transponders including the steps of alternatingly switching into and out of a signal receiving mode according to a predetermined cycle during said minimal power conserving state, monitoring for the presence of interrogation signals from said interrogator in said signal receiving mode during said minimal power conserving state, switching to said fully active state when said interrogation signal is present, receiving and processing said interrogation signal in said fully active state, transmitting data signals to said interrogator in response to said interrogation signal in said active state, said data signals including data on at least one of a status, content, and description of said unit of inventory to which said corresponding one of said plurality of transponders is attached, and reverting to said minimal power conserving state after transmitting said data signals.

11. A method according to claim 10, wherein said step of alternatingly switching into and out of a signal receiving mode includes activating a transceiver circuit in said transponders in said signal receiving mode of operation.

12. A method according to claim 11, wherein said step of alternatingly switching into and out of the signal receiving mode includes generating first timing signals for timing when to alternatingly energize and de-energize said transceiver circuit, respectively.

13. A method according to claim 10, wherein said step of periodically transmitting an interrogation signal to said plurality of transponders includes the step of transmitting interrogation signals directed to specific ones of said plurality of transponders in sequential order.

14. A method according to claim 10, wherein said step of periodically transmitting an interrogation signal to said plurality of transponders includes the step of transmitting a plurality of interrogation signals each having an address corresponding to an identity of a specific one of said plurality of transponders.

15. A method according to claim 14, wherein said step of receiving and processing said interrogation signal includes determining whether an interrogation signal includes an address that corresponds to an identity of a specific one of said plurality of transponders receiving said interrogation signal.

16. A method according to claim 15, wherein said step of receiving and processing said interrogation signal further includes continuing monitoring for the presence of an interrogation signal that does include an address corresponding to the identification number of the specific one of said plurality of transponders for a predetermined number of predetermined window time periods, switching out of said signal receiving mode during said minimal power conservation state when no interrogation signal that includes an address corresponding to the identification number of the specific one of said plurality of transponders is received by the end of each of said predetermined window time periods, and reverting to said alternatingly switching said specific one of said plurality of transponders into and out of said signal receiving mode according to said predetermined cycle after reverting to said minimal power conservation state for a remainder of said predetermined number of window time periods.

17. A method according to claim 10, wherein said step of receiving and processing said interrogation signal includes resynchronizing and resetting operation of a specific one of said plurality of transponders relative to said interrogator.

18. A method according to claim 15, wherein said step of receiving and processing said interrogation signal includes resynchronizing and resetting operation of said specific one of said plurality of transponders relative to said interrogator when an interrogation signal that does include an address corresponding to the identification number of the specific one of said plurality of transponders is received.

19. A method according to claim 10, wherein said step of transmitting data signals in response to said interrogation signals includes energizing said transceiver in a transmitting mode of operation in said fully active state so as to transmit said data signals in response to said interrogation signal.

20. A method according to claim 10, wherein said step of transmitting said data signals in response to said interrogation signal includes transmitting an acknowledgement signal verifying a presence of each of said plurality of transponders and a corresponding one of said units of inventory.

21. A method according to claim 15, wherein said step of transmitting data signals in response to said interrogation signals includes energizing said transceiver in a transmitting mode of operation in said fully active state so as to transmit said data signals in response to said interrogation signal when an interrogation signal that does include an address corresponding to the identification number of the specific one of said plurality of transponders is received.

22. A method according to claim 15, wherein said step of transmitting said data signals in response to said interrogation signal includes transmitting an acknowledgement signal verifying a presence of each of said plurality of transponders and a corresponding one of said units of inventory when an interrogation signal that does include an address corresponding to the identification number of the specific one of said plurality of transponders is received.

23. A method according to claim 10, further comprising the steps of:

monitoring for the occurrence of tampering in at least one of said plurality of transponders and said corresponding units of inventory; and generating an alarm signal to said interrogator when the occurrence of tampering is detected.

24. A method according to claim 10, further comprising the steps of:

monitoring for sensor data inputs in each of said plurality of transponders;

storing said sensor data inputs in a corresponding one of said plurality of transponders; and transmitting said stored sensor data inputs to said interrogator as part of said step of transmitting data signals to said interrogator.

25. A method according to claim 10, further comprising the steps of receiving said data signals in said interrogator from said plurality of transponders; and processing said data signals in said interrogator in response to receiving said data signals.

26. A method according to claim 25, wherein said step of processing said data signals in said interrogator includes transmitting said processed data signals to a database system controller.

27. A method according to claim 17, wherein said step of periodically transmitting an interrogation signal to said plurality of transponders includes the step of transmitting timing instructions and data for said step of resetting and synchronizing operation of said plurality of transponders with said interrogator.

28. A method according to claim 10, wherein said step of periodically transmitting an interrogation signal to said plurality of transponders includes the step of transmitting instruction signals instructing specific ones of said plurality of transponders to transmit said data signals.

29. A method according to claim 10, further comprising the step of:

enrolling said plurality of transponders in a periodic mode of operation, said step of enrolling said plurality of transponders including the steps of transmitting an enrolling signal to each of said plurality of transponders from said at least one interrogator;

alternatingly operating each of said plurality of transponders between one of a fully active state and a minimal power conserving state, wherein said step of alternatingly operating said transponders includes energizing said plurality of transponders in a fully active state, monitoring for the presence of enrolling signals, receiving and processing said enrolling signals when present, transmitting response data signals to said interrogator in response to said enrolling signals, reverting to said minimal power conserving state after transmitting said data signals, and commencing said periodic mode of operation based on said received and processed enrolling signals.

30. A method according to claim 29, wherein said step of alternatingly operating each of said transponder between one of a fully active state and a minimal power conserving state includes generating second timing signals for timing when to alternatingly switch between said fully active and minimal power conserving states.

31. A method according to claim 29, wherein said step of periodically transmitting an enrolling signal to said plurality of transponders includes the step of transmitting a plurality of enrolling signals each having an address corresponding to an identity of a specific one of said plurality of transponders.

32. A method according to claim 31, wherein said step of monitoring for the presence of enrolling signals includes monitoring for the presence of enrolling signals for a predetermined first number of predetermined first wait time periods, and continuing monitoring for the presence of enrolling signals for a predetermined second number of predetermined second wait time periods when no enrolling signal is received by the end of said predetermined first number of predetermined first wait time periods.

33. A method according to claim 32, wherein said step of receiving and processing said enrolling signal includes determining whether an enrolling signal includes an address that corresponds to an identity of a specific one of said plurality of transponders receiving said enrolling signal.

34. A method according to claim 33, wherein said step of receiving and processing said enrolling signals further includes storing timing data for said step of commencing said periodic mode of operation when an enrolling signal that does include an address corresponding to the identification number of the specific one of said plurality of transponders is received, continuing to monitor for the presence of an enrolling signal that does include an address corresponding to the identification number of the specific one of said plurality of transponders for a predetermined number of predetermined window time periods when no enrolling signal that includes an address corresponding to the identification number of the specific one of said plurality of transponders is received for a predetermined third wait time period, and reverting to continuing to monitor for the presence of enrolling signals for a predetermined second number of predetermined second wait time periods when no enrolling signal that includes an address corresponding to the identification number of the specific one of said plurality of transponders is received by the end of said predetermined third wait time period.

35. A method according to claim 29, wherein said step of transmitting said response data signals in response to said enrolling signals includes transmitting an acknowledgement signal verifying receipt and processing of said enrolling signals.

36. A method according to claim 29, further comprising the steps of receiving said response data signals in said interrogator from said plurality of transponders; and processing said data signals in said interrogator in response to receiving said response data signals.

37. A method according to claim 29, wherein said step of periodically transmitting enrolling signals to said plurality of transponders includes the step of transmitting said timing data for said step of storing timing data to commence said periodic mode of operation.

38. A system for remote monitoring communication and control between a plurality of remotely tracked items, comprising:

a plurality of transponder devices each fixedly mounted onto a corresponding item to be remotely tracked, each of said plurality of transponder devices having a first transceiver circuit;

at least one interrogator device having a second transceiver circuit, said second transceiver circuit operatively communicating with each of said first transceiver circuits in said plurality of transponders; and a system controller device operatively connected to said at least one interrogator to generate parameter data for controlling said at least one interrogator, wherein said interrogator device includes means for controlling said second transceiver circuit to transmit an interrogation signal to each said transceiver circuit of said plurality of transponders based on said parameter data from said system controller device, and each of said plurality of transponders includes control means for alternatingly operating said transponder between one of a fully active state and a minimal power conserving state, said control means being operatively connected to said first transceiver circuit whereby said first transceiver circuit alternatingly switches, according to a predetermined cycle, into and out of a signal receiving mode during which said first transceiver circuit monitors for the presence of interrogation signals from said interrogator during said minimal power conserving state, and whereby said control means processes a received interrogation signal in response thereto in a fully active state, wherein said control means of each of said plurality of transponder devices includes a first digital data processing circuit device having means for generating a response signal to be transmitted to said at least one interrogator device via said first transceiver circuit in a transmitting mode during said fully active state in response to said received interrogation signal, said response signal including data on at least one of a status, content, and description of a remotely tracked item to which a corresponding one of said plurality of transponder devices is attached.

39. A system according to claim 38, wherein said system controller device for generating parameter data to control operation of said at least one interrogator device includes a digital data processing system.

40. A system according to claim 38, wherein said control means of each of said plurality of transponder devices includes a first digital data processing circuit device operatively connected to a first timer circuit and to said first transceiver circuit, said first timer circuit generating timing signals for said first data processing circuit to control said switching of said first transceiver circuit means into and out of said signal receiving mode during said minimal power conserving state.

41. A system according to claim 40, wherein said first digital data processing circuit device is operatively connected to at least one sensor device for generating sensor input data to be stored in said corresponding transponder and then transmitted, to said at least one interrogator device, said first digital data processing circuit including means for periodically monitoring said at least one sensor device for sensor input data during said minimal power conserving state.

42. A system according to claim 40, wherein said first digital data processing circuit device is operatively connected to at least one tamper-detecting device for generating tamper warning data to be transmitted to said at least one interrogator device, said first digital data processing circuit including means for periodically monitoring said at least one tamper-detecting device for tamper warning data during said minimal power conserving state.

43. A system according to claim 40, wherein said first digital data processing circuit device further includes means for resynchronizing and resetting operation of said first timer circuit relative to said at least one interrogator device.

44. A system according to claim 40, wherein said control means of said at least one interrogator device includes a second digital data processing circuit device operatively connected to a second timer circuit and to said second transceiver circuit, said second timer circuit generating master timing signals for said second data processing circuit to control transmission of an interrogation signal to each of said plurality of transponder devices.

45. A system according to claim 44, wherein said interrogation signal for each of said plurality of transponder devices includes at least address data corresponding to an identity of a specific one of said plurality of transponder devices and timer synchronization data.

46. A system according to claim 45, wherein said first digital data processing circuit device includes means for resynchronizing and resetting operation of said first timer circuit relative to said at least one interrogator device and means for generating a response signal to be transmitted to said at least one interrogator device via said first transceiver circuit in a transmitting mode during said fully active state in response to a received interrogation signal having address data corresponding to an identity of a transponder receiving said received interrogation signal.

47. A system according to claim 46, wherein said response signal further includes sensor input data from at least one sensor device operatively connected to a corresponding one of said plurality of transponder devices.

48. A system according to claim 38, wherein said response signal further includes tamper warning data from at least one tamper-detecting device operatively connected to a corresponding one of said plurality of transponder devices.

49. A system according to claim 38, wherein each of said plurality of transponder devices includes a long-life battery pack for powering operation of a corresponding one of said plurality of transponder devices.

* * * * *